US010768033B2

(12) United States Patent
Saito et al.

(10) Patent No.: US 10,768,033 B2
(45) Date of Patent: Sep. 8, 2020

(54) THERMAL FLOWMETER

(71) Applicant: Hitachi Automotive Systems, Ltd., Hitachinaka-shi, Ibaraki (JP)

(72) Inventors: Tomoaki Saito, Hitachinaka (JP); Shinobu Tashiro, Hitachinaka (JP); Naoki Saito, Hitachinaka (JP); Masashi Fukaya, Tokyo (JP); Akira Uenodan, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 91 days.

(21) Appl. No.: 16/307,318

(22) PCT Filed: Jun. 14, 2017

(86) PCT No.: PCT/JP2017/021909
§ 371 (c)(1),
(2) Date: Dec. 5, 2018

(87) PCT Pub. No.: WO2018/003496
PCT Pub. Date: Jan. 4, 2018

(65) Prior Publication Data
US 2019/0137311 A1 May 9, 2019

(30) Foreign Application Priority Data
Jul. 1, 2016 (JP) .................... 2016-131982

(51) Int. Cl.
*G01F 1/68* (2006.01)
*F02D 41/18* (2006.01)
(Continued)

(52) U.S. Cl.
CPC ......... *G01F 1/6842* (2013.01); *F02D 41/182* (2013.01); *G01F 1/684* (2013.01); *G01F 1/688* (2013.01); *G01F 1/696* (2013.01)

(58) Field of Classification Search
CPC .................... G01F 1/68; F02D 41/18
See application file for complete search history.

(56) References Cited

U.S. PATENT DOCUMENTS 6,332,356 B1 12/2001 Hecht et al.
8,752,424 B2 * 6/2014 Ban ...................... G01F 1/6842
73/202

(Continued)

FOREIGN PATENT DOCUMENTS

DE 10 2008 049 843 A1 7/2010
JP 2002-506528 A 2/2002
(Continued)

OTHER PUBLICATIONS

International Search Report (PCT/ISA/210) issued in PCT Application No. PCT/JP2017/021909 dated Aug. 29, 2017 with English translation (five (5) pages).

(Continued)

*Primary Examiner* — Jewel V Dowtin
(74) *Attorney, Agent, or Firm* — Crowell & Moring LLP

(57) ABSTRACT

The object of the invention is to obtain a thermal flowmeter which effectively causes water droplets to be directed to a discharge port when the water droplets adhered to a wall surface of a first passage are drawn into a third passage portion. A thermal flowmeter of the present invention includes a sub-passage that takes a measurement gas flowing through a main passage; and a flow detection unit that measures a flow rate of the measurement gas by performing heat transfer with the measurement gas flowing through a sub-passage. Further, the sub-passage includes a first passage, a second passage portion branching in the middle of the first passage portion to be directed toward the flow detection unit; and a third passage portion branching in the middle of the second passage portion to be directed toward a third outlet, and a pressure loss generation means is provided between a third inlet and the third outlet of the third passage portion.

10 Claims, 24 Drawing Sheets

(51) Int. Cl.
  *G01F 1/684* (2006.01)
  *G01F 1/688* (2006.01)
  *G01F 1/696* (2006.01)

(56) References Cited

U.S. PATENT DOCUMENTS

| | | | |
|---|---|---|---|
| 9,983,038 B2* | 5/2018 | Kamiya | ............... G01F 5/00 |
| 2005/0217357 A1 | 10/2005 | Lenzing et al. | |
| 2013/0055799 A1 | 3/2013 | Tsujii | |
| 2018/0283918 A1 | 10/2018 | Miki et al. | |

FOREIGN PATENT DOCUMENTS

| JP | 2006-501452 A | 1/2006 |
|---|---|---|
| JP | 2013-53965 A | 3/2013 |
| WO | WO 2010/031629 A1 | 3/2010 |
| WO | WO 2017/056699 A1 | 4/2017 |

OTHER PUBLICATIONS

Japanese-language Written Opinion (PCT/ISA/237) issued in PCT Application No. PCT/JP2017/021909 dated Aug. 29, 2017 (six (6) pages).

* cited by examiner

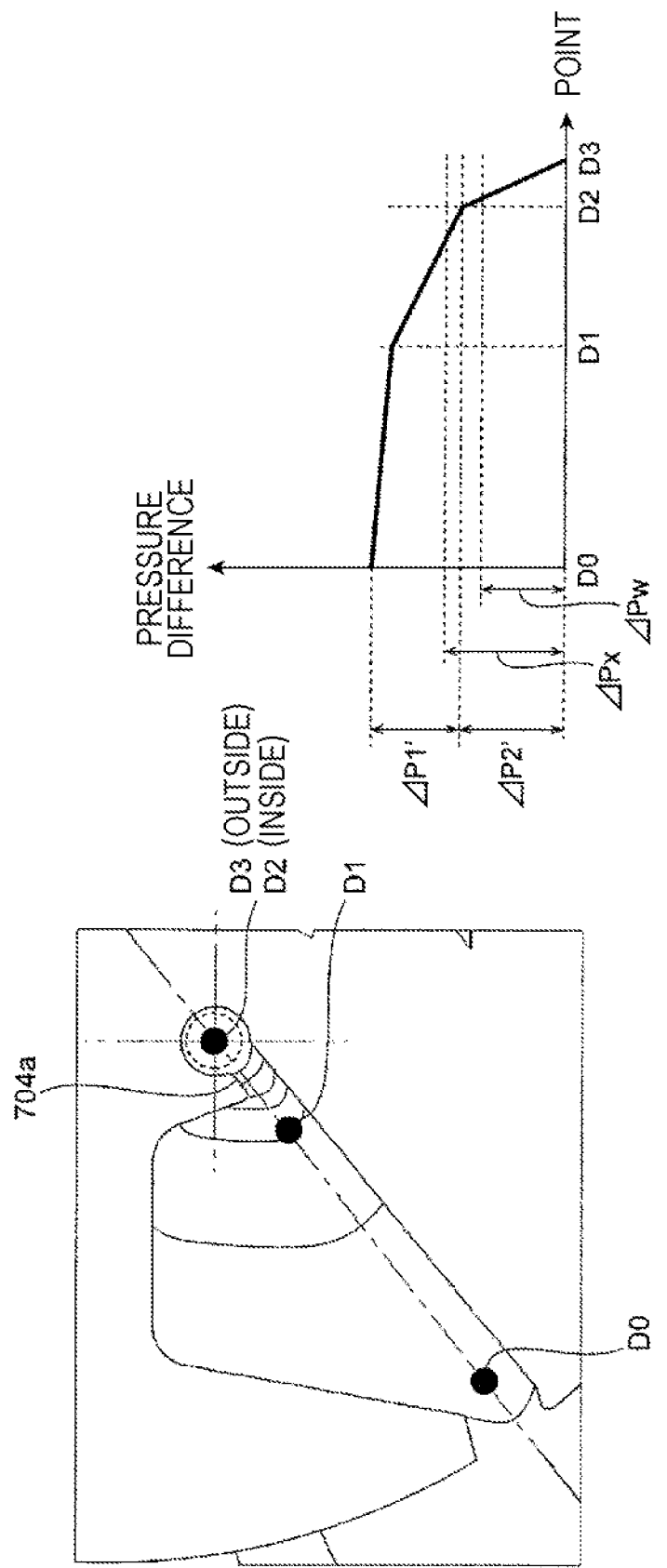

THERMAL FLOWMETER

TECHNICAL FIELD

The present invention relates to a thermal flowmeter.

BACKGROUND ART

A thermal flowmeter that measures a flow rate of a gas includes a flow detection unit configured to measure the flow rate and is configured to measure the flow rate of the gas by performing heat transfer between the flow detection unit and the gas to be measured. In the thermal flowmeter, a sub-passage structure such as centrifugal separation by a cyclone bypass, inertial separation by a branch passage, or the like is adopted from the viewpoint of a contamination measure. For example, PTL 1 discloses a structure of a thermal flow measurement device having a drain hole.

CITATION LIST

Patent Literature

PTL 1: DE 10 2008 049 843 A1

SUMMARY OF INVENTION

Technical Problem

In a case where a flow detection element is arranged inside a sub-passage and measurement is performed while air in a main passage is detoured like an air flow detection device, it is necessary to provide a design in consideration of influence of water droplets and foreign matters contained in the air flowing through the main passage. When the water droplets adhere to a surface of the flow detection element, an instantaneous output fluctuation occurs to cause a measurement error. In PTL 1, the drain hole is provided in a separation region generated in a second passage inlet portion branching from a first passage extending straight from an inlet of the sub-passage to an outlet.

However, when the flow in the main passage flows between the low flow velocity and the medium flow velocity, the water droplets or the like adhere to a wall surface and reach the flow detection element via a branch portion of a measurement passage. In particular, there is no separation flow generation structure in the vicinity of the drain hole in PTL 1, and thus, a pressure gradient increases in the vicinity of the drain hole. Therefore, when water droplets, an amount of which exceeds the drainage capacity of the drain hole, reach the drain hole at once, there is a concern that water droplets that has not been drained from the drain hole reach the flow detection element along the wall surface.

The present invention has been made in view of the above-described facts, and an object thereof is to provide a thermal flowmeter capable of efficiently discharging water droplets flowing into a sub-passage to a main passage.

Solution to Problem

A thermal flowmeter of the present invention for solving the above problem is a thermal flowmeter including: a casing arranged in a main passage; a sub-passage provided in the casing to take a measurement gas flowing through the main passage; and a flow detection unit provided in the sub-passage to measure a flow rate of the measurement gas. The sub-passage includes: a first passage portion communicating between a first inlet open to the casing and a first outlet open to the casing; a second passage portion communicating between a second inlet open to the first passage portion and a second outlet open to the casing or the first passage portion; and a third passage portion communicating between a third inlet open to the second passage portion and a third outlet open to the casing, and a pressure loss generation means is provided between the third inlet and the third outlet of the third passage portion.

Advantageous Effects of Invention

Since the pressure loss generation means is provided between the third inlet and the third outlet of the third passage portion according to the present invention, it is possible to smoothly guide water droplets flowing into the sub-passage to the third outlet of the third passage portion and to efficiently discharge the water droplets to the main passage. Another characteristic relating to the present invention will become apparent from the description of the present specification and the accompanying drawings. In addition, other objects, configurations, and effects will be apparent from the following description of embodiments.

BRIEF DESCRIPTION OF DRAWINGS

FIG. 7A is a view illustrating a pressure gradient inside a third passage portion having a pressure loss generation means.

DESCRIPTION OF EMBODIMENTS

Next, embodiments of the present invention will be described with reference to the drawings.

First Embodiment

Figure 1:
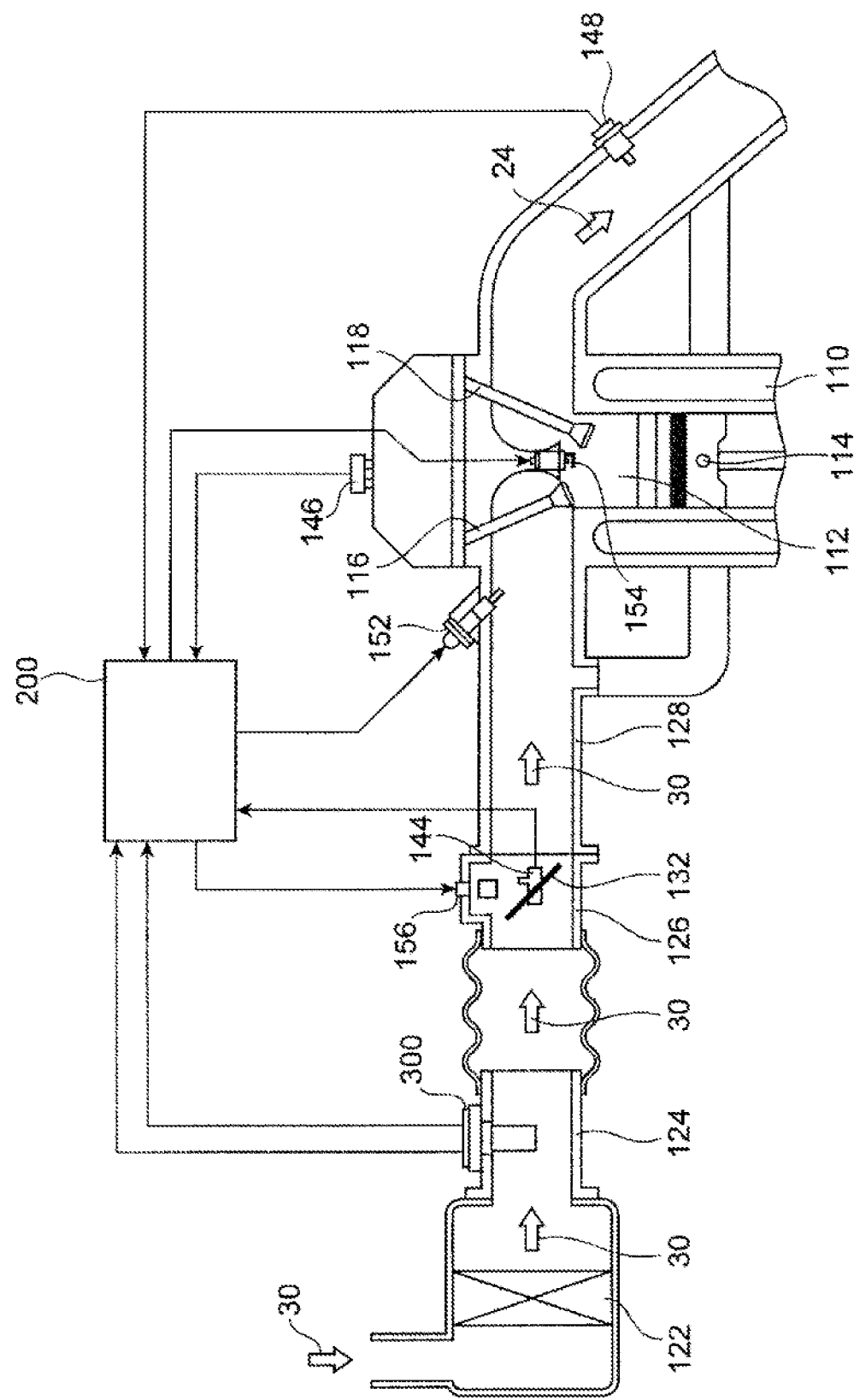
FIG. 1 is a system diagram illustrating an embodiment in which a thermal flowmeter according to the present invention is used in an internal combustion engine control system.

FIG. 1 is a system diagram illustrating an embodiment in which a thermal flowmeter according to the present invention is used in an electronic fuel injection-type internal combustion engine control system.

The internal combustion engine control system according to the present embodiment is a control system of an automobile engine, and is mounted in a vehicle. In the internal combustion engine control system, intake air is sucked from an air cleaner 122 as a measurement gas 30 on the basis of an operation of an internal combustion engine 110, which includes an engine cylinder 112 and an engine piston 114, and is guided to a combustion chamber of the engine cylinder 112 via, for example, an intake pipe as a main passage 124, a throttle body 126, and an intake manifold 128. A flow rate of the measurement gas 30, which is the intake air guided to the combustion chamber, is measured by the thermal flowmeter 300 according to the present invention, and fuel is supplied from a fuel injection valve 152 based on the measured flow rate, and is guided to the combustion chamber in the state as an air-fuel mixture with the measurement gas 30 which is intake air. Incidentally, the fuel injection valve 152 is provided at an intake port of the internal combustion engine 110 in the present embodiment, and the fuel injected to the intake port molds the air-fuel mixture together with the measurement gas 30 as the intake air. The air-fuel mixture is guided to the combustion chamber via an intake valve 116 and is burnt to generate mechanical energy.

The fuel and air guided to the combustion chamber form a mixed state of the fuel and the air, and is explosively burnt by spark ignition of a spark plug 154, thereby generating the mechanical energy. After burning, the gas is guided into an exhaust pipe from an exhaust valve 118, and is discharged, as exhaust 24, outside a car from the exhaust pipe. A flow rate of the measurement gas 30 as the intake air guided to the combustion chamber is controlled by a throttle valve 132 whose opening degree is changed based on an operation of an accelerator pedal. A supply amount of fuel is controlled on the basis of the flow rate of the intake air guided to the combustion chamber, and a driver can control the mechanical energy generated by the internal combustion engine 110 by controlling the opening degree of the throttle valve 132 and controlling the flow rate of the intake air guided to the combustion chamber.

A flow rate and a temperature of the measurement gas 30, which is the intake air taken from the air cleaner 122 and flowing through the main passage 124, are measured by the thermal flowmeter 300, and electrical signals indicating the flow rate and temperature of the intake air are input from the thermal flowmeter 300 to a control device 200. In addition, an output of a throttle angle sensor 144, which measures the opening degree of the throttle valve 132, is input to the control device 200. Further, an output of a rotation angle sensor 146 is input to the control device 200 in order to measure a position or a state of the engine piston 114, the intake valve 116, or the exhaust valve 118 of the internal combustion engine 110, and rotation speed of the internal combustion engine 110. An output of an oxygen sensor 148 is input to the control device 200 in order to measure a state of a mixing ratio between the amount of fuel and the amount of air based on the state of the exhaust 24.

The control device 200 calculates a fuel injection amount and an ignition timing based on the flow rate of the intake air which is an output of the thermal flowmeter 300 and the rotation speed of the internal combustion engine 110 measured based on an output of the rotation angle sensor 146. The amount of fuel to be supplied from the fuel injection valve 152 and the ignition timing ignited by the spark plug 154 are controlled based on these calculation results. In practice, the fuel supply amount and the ignition timing are finely controlled based on the temperature of intake air measured by the thermal flowmeter 300, a change state of a throttle angle, a change state of the engine rotation speed, a state of an air-fuel ratio measured by the oxygen sensor 148. The control device 200 further controls the amount of air bypassing the throttle valve 132 using an idle air control valve 156 in an idle operation state of the internal combustion engine 110 and controls the rotation speed of the internal combustion engine 110 in the idle operation state.

FIG. 2 illustrates an appearance of the thermal flowmeter 300. FIG. 2A is a front view of the thermal flowmeter 300, FIG. 2B is a left side view, FIG. 2C is a rear view, and FIG. 2D is a right side view. The thermal flowmeter 300 includes a housing (casing) 301. The housing 301 is inserted into the intake pipe and arranged in the main passage 124 (see FIG. 1). A flange 305 configured for fixing to the intake pipe and an external connection portion 306 exposed to the outside of the intake pipe are provided at a proximal end portion of the housing 301.

The housing 301 is supported in a cantilever manner by fixing the flange 305 to an intake pipe and is arranged so as to extend along a direction perpendicular to the main flow direction of the measurement gas flowing through the main passage 124. The housing 301 is provided with a sub-passage configured to take the measurement gas 30 flowing through the main passage 124, and a flow detection unit 602 configured to detect the flow rate of the measurement gas 30 is arranged in the sub-passage.

Figure 2A:
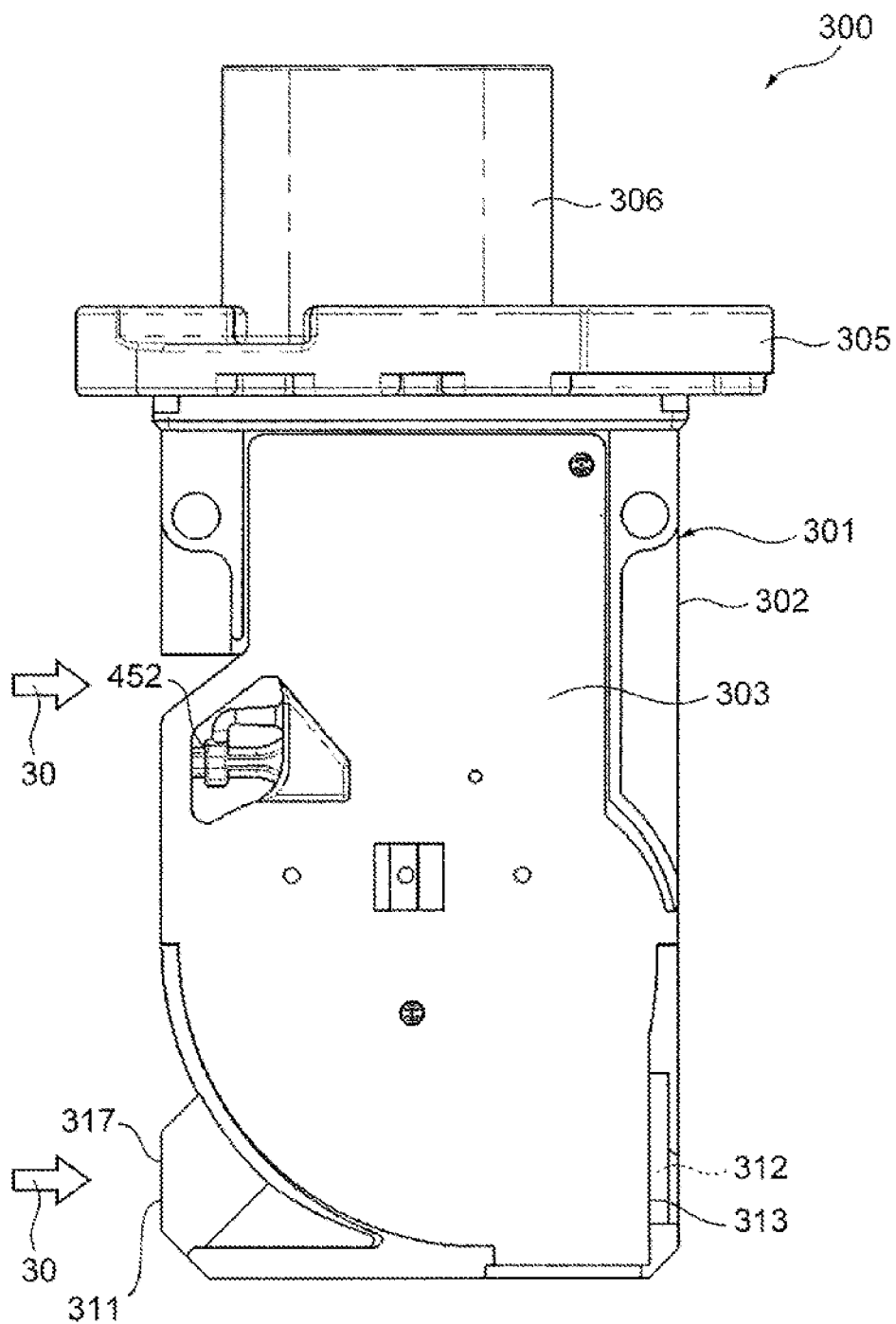
FIG. 2A is a front view illustrating an appearance of a thermal flowmeter according to a first embodiment.
Figure 2B:
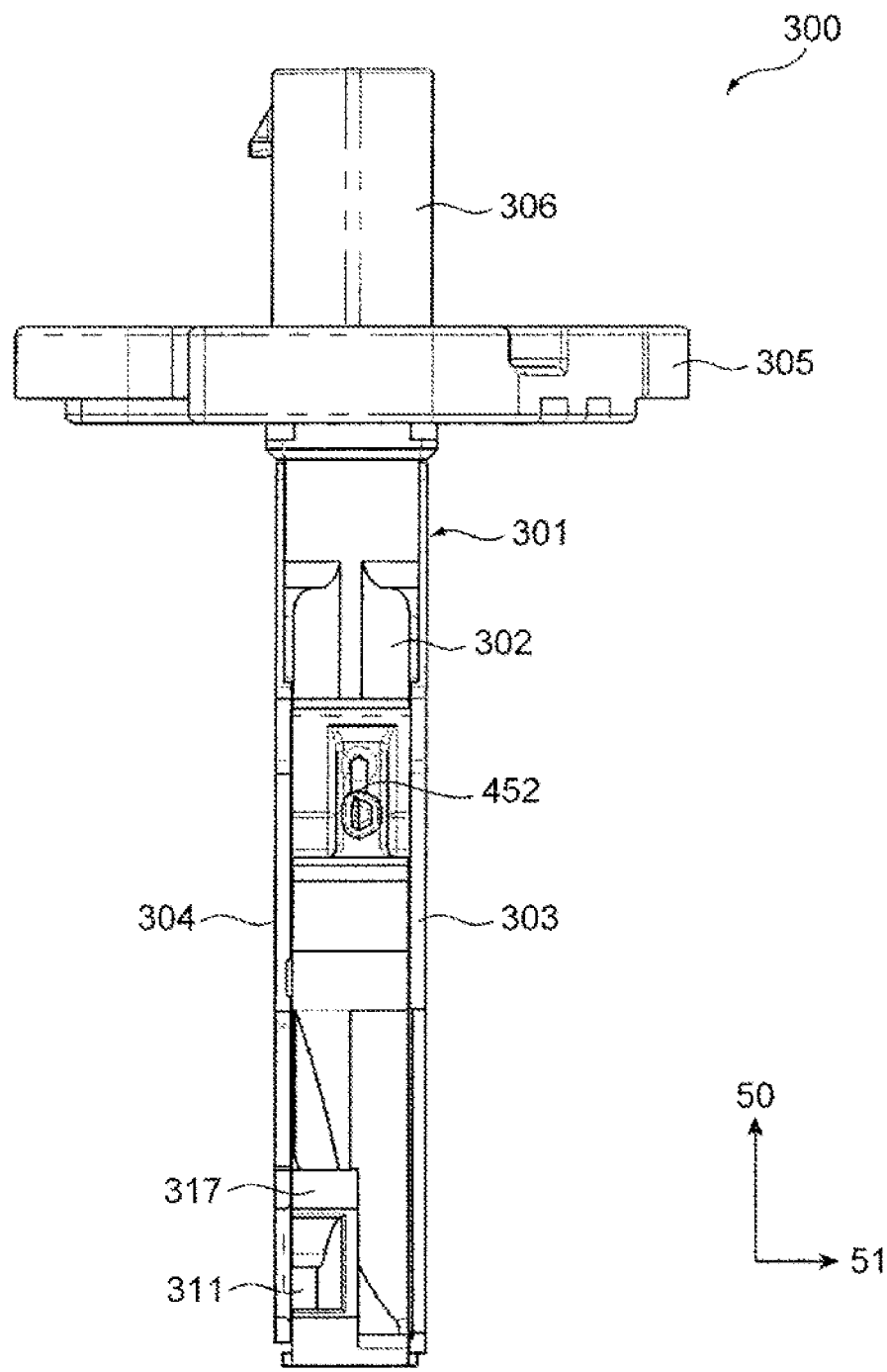
FIG. 2B is a left side view illustrating the appearance of the thermal flowmeter according to the first embodiment.
Figure 2C:
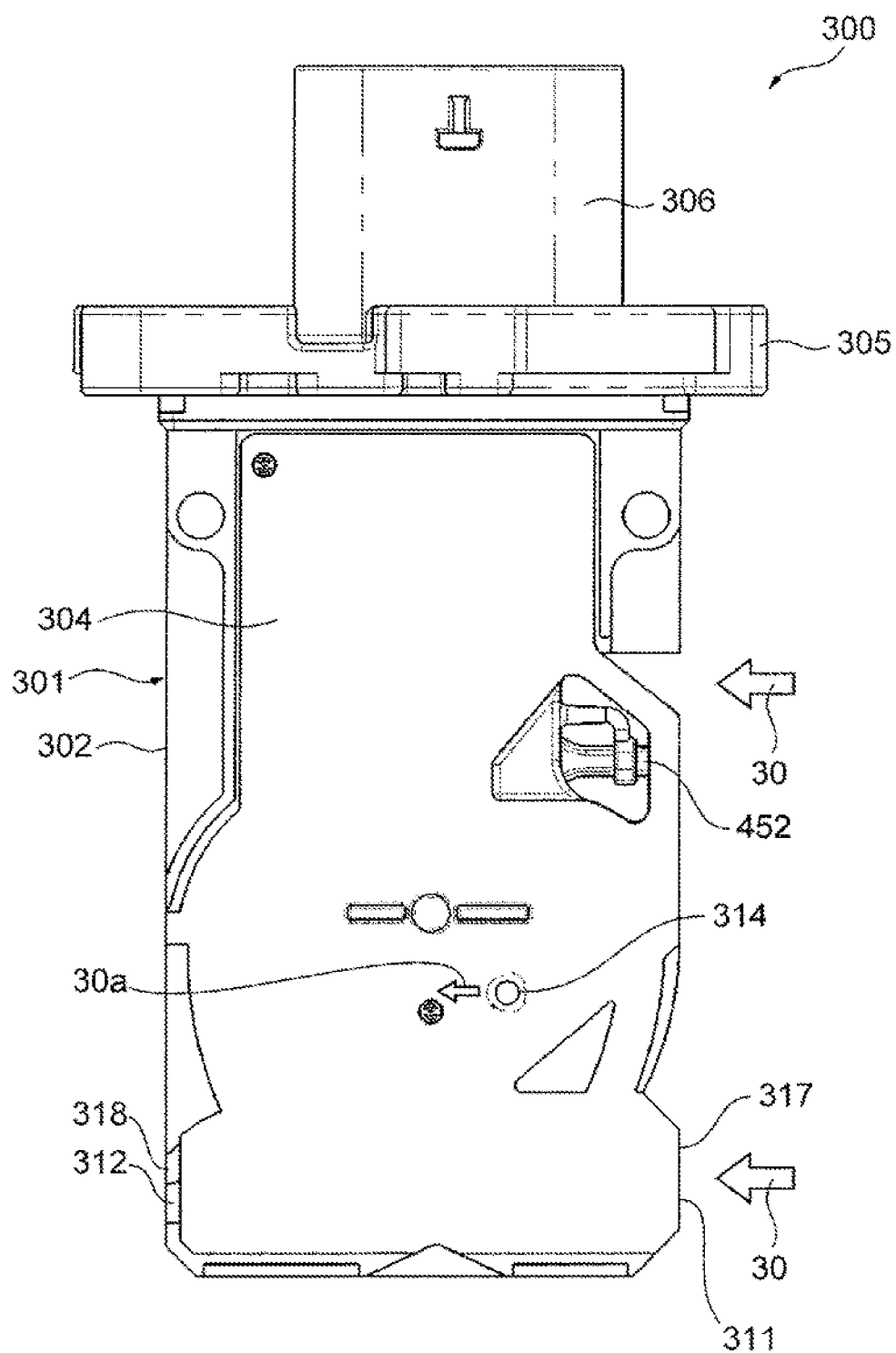
FIG. 2C is a rear view illustrating the appearance of the thermal flowmeter according to the first embodiment.
Figure 2D:
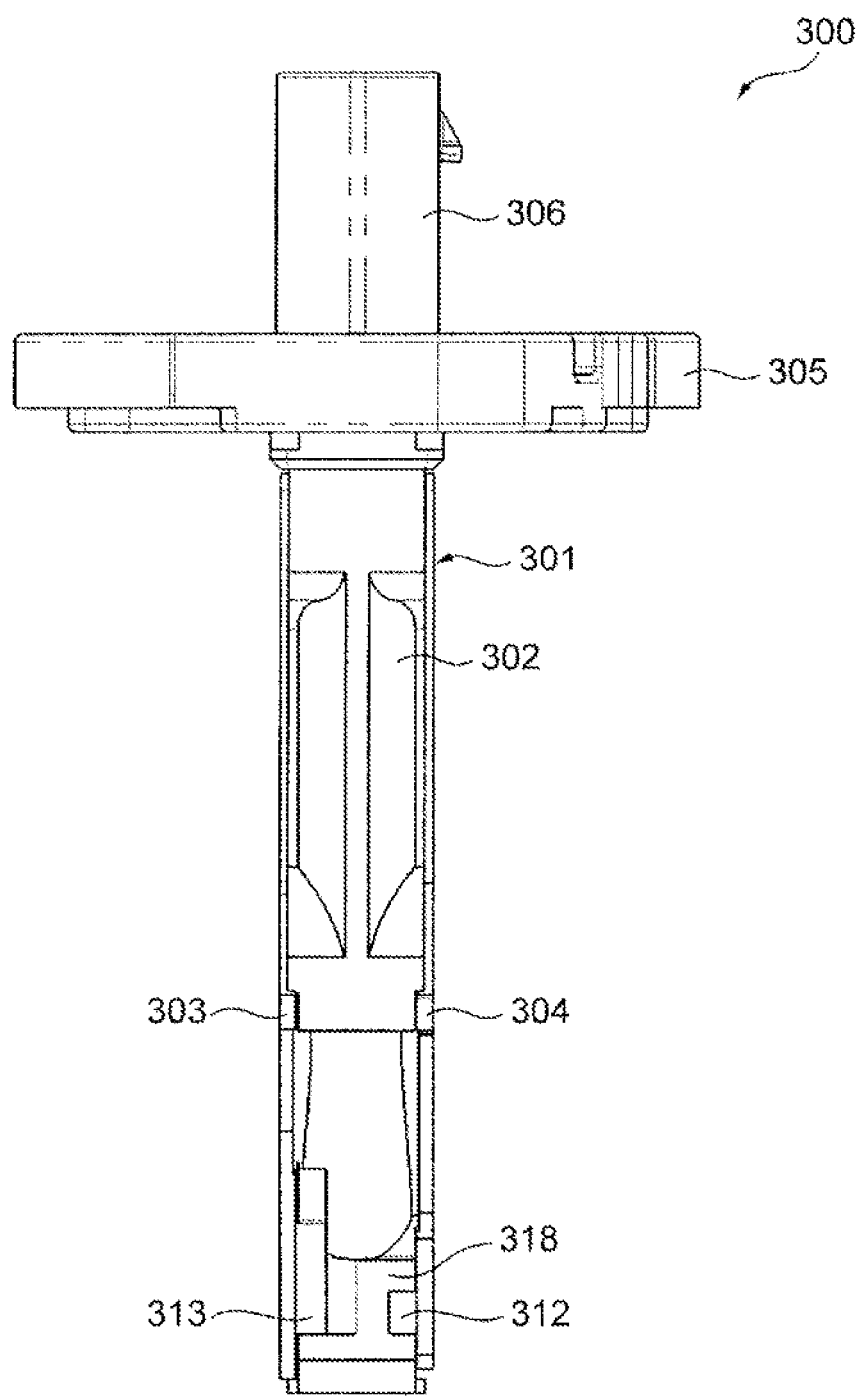
FIG. 2D is a right side view illustrating the appearance of the thermal flowmeter according to the first embodiment.

An inlet (first inlet) 311 configured to take a part of the measurement gas 30 such intake air into the sub-passage is open at one end portion arranged on the upstream side in the main flow direction of the housing 301. Further, a first outlet 312 and a second outlet 313, which are configured to return the measurement gas 30 from the sub-passage to the main passage 124 are open at the other end portion arranged on the downstream side in the main flow direction of the housing 301. As illustrated in FIG. 2D, the first outlet 312 and the second outlet 313 are arranged side by side in a thickness direction (Z-axis direction) of the housing 301.

The inlet 311 is provided on a distal end portion side of one end portion of the housing 301, and can take a gas in a portion close to a central portion away from an inner wall surface of the main passage into the sub-passage. Therefore, it is difficult to be affected by a temperature of the inner wall surface of the main passage, and it is possible to suppress deterioration of measurement accuracy of the flow rate and temperature of the gas.

In the vicinity of the inner wall surface of the main passage, fluid resistance is large and the flow velocity becomes lower than the average flow velocity of the main passage. In the thermal flowmeter 300 of the present embodiment, however, the inlet 311 is provided on the distal end portion side of the thin and long housing 301, which extends from the flange 305 toward the center of the main passage, and thus, it is possible to take the gas with the high flow velocity in the central portion of the main passage into the sub-passage. In addition, since the first outlet 312 and the second outlet 313 of the sub-passage are also provided on the distal end portion side of the housing 301, the gas flowing inside the sub-passage can be returned to the central portion of the main passage at the high flow velocity.

The housing 301 has a substantially rectangular wide surface on the front surface thereof, but has a narrow side surface (thin thickness). The front and rear surfaces of the housing 301 are arranged along the main flow direction of the measurement gas flowing through the main passage, and the side surfaces are arranged to oppose each other in the main flow direction. As a result, the thermal flowmeter 300 can have the sub-passage with a sufficient length by reducing fluid resistance with respect to the measurement gas 30.

That is, in the thermal flowmeter 300 of the present embodiment, a shape of the housing 301 projected on an orthogonal plane orthogonal to the flow direction of the measurement gas 30 flowing through the main passage 124 has a shape which has a length dimension defined in a first direction 50 on the orthogonal plane and a thickness dimension defined in a second direction 51 perpendicular to the first direction 50 (see FIG. 2B) on the orthogonal plane such that the thickness dimension is smaller than the length dimension.

The housing 301 is provided with a temperature detection unit 452 configured to measure a temperature of the measurement gas 30. The temperature detection unit 452 is provided at a position recessed toward the other end portion side at one end portion in a central portion in the longitudinal direction, and has a shape protruding toward the main flow direction.

Figure 3A:
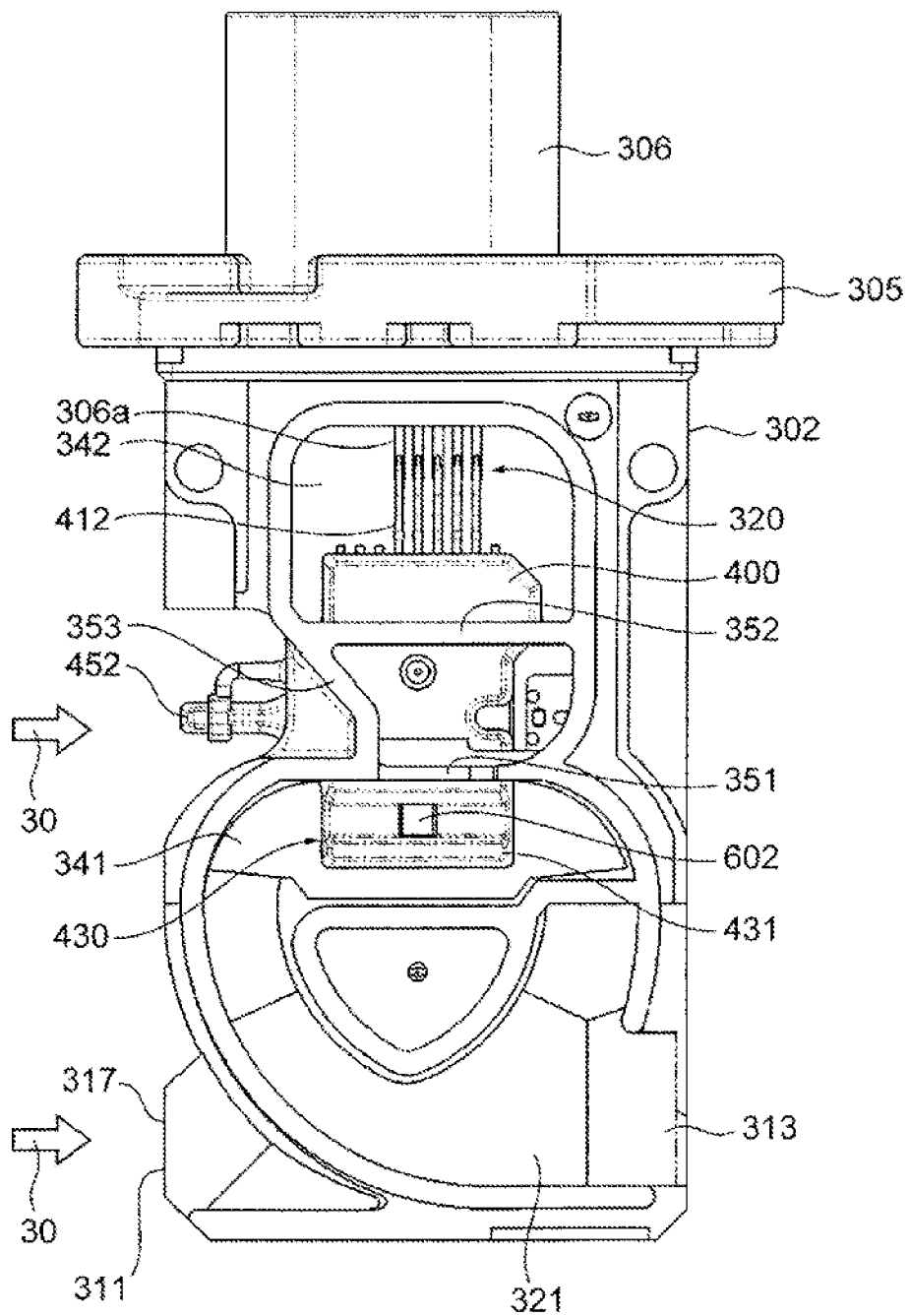
FIG. 3A is a front view of a housing body.
Figure 3B:
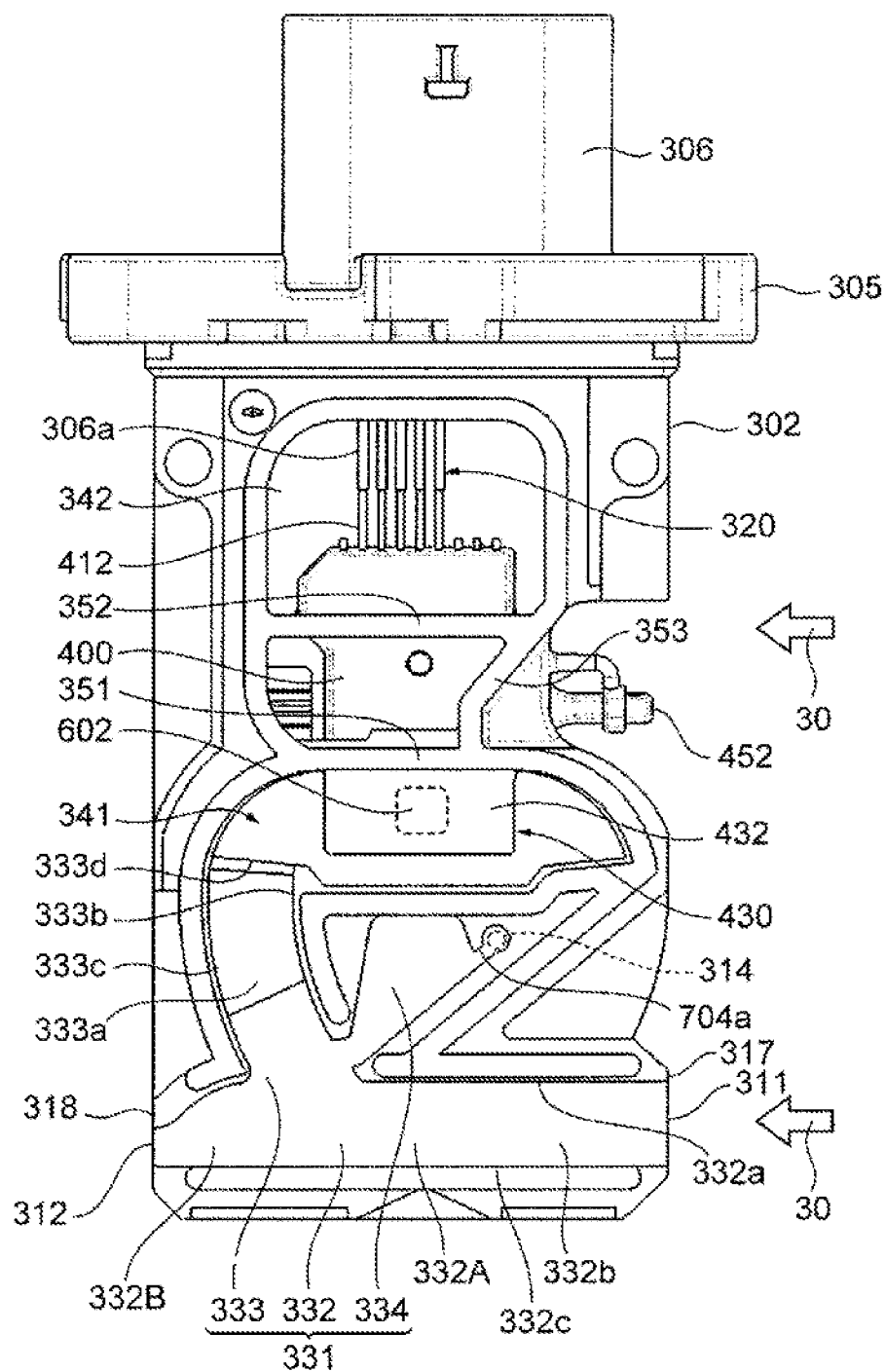
FIG. 3B is a rear view of the housing body.
Figure 3C:
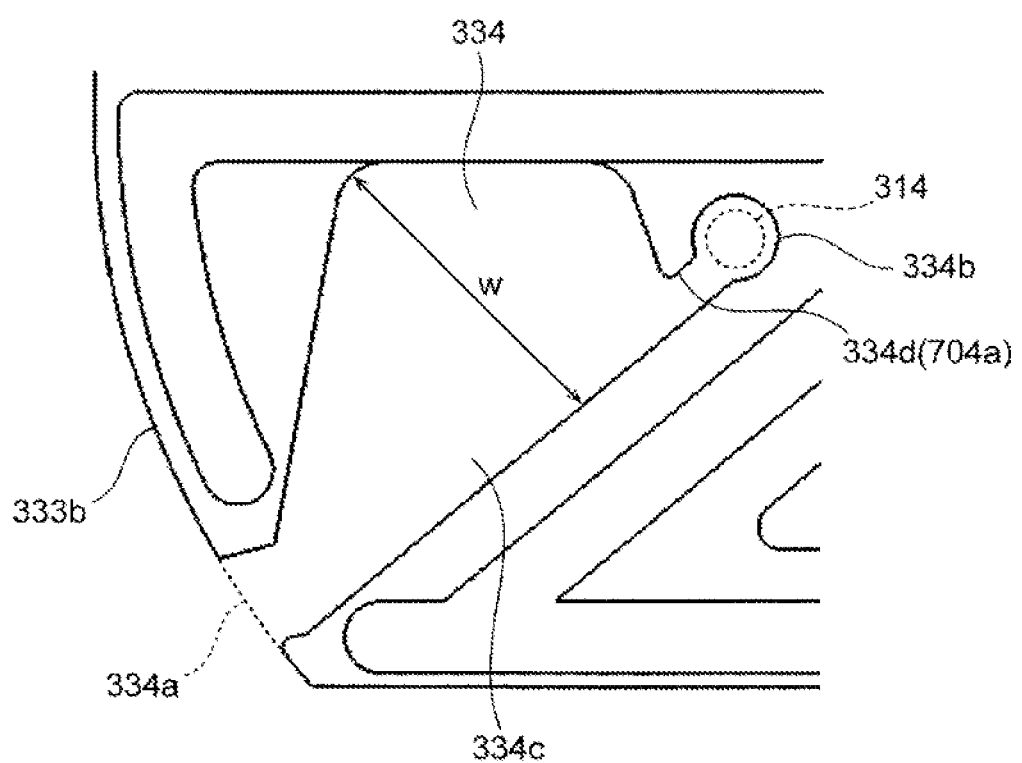
FIG. 3C is an enlarged view of a main part of FIG. 3B.

FIG. 3 illustrates a state where a front cover 303 and a back cover 304 are detached from the housing 301, FIG. 3A is a front view, FIG. 3B is a rear view, and FIG. 3C is an enlarged view of a main part of FIG. 3B.

The housing 301 is configured by attaching the front cover 303 and the back cover 304 to front and back surfaces of a housing body 302. A circuit package 400, which includes a flow detection unit 602 configured to measure a flow rate of the measurement gas 30 and a temperature detection unit 452 configured to measure a temperature of the measurement gas 30, is integrally molded in the housing body 302.

Further, sub-passage grooves to mold a sub-passage by cooperation with the front cover 303 and the back cover 304 are formed in the housing body 302. In the present embodiment, the sub-passage grooves are recessed on the front and back surfaces of the housing body 302, and the sub-passage of the housing 301 is completely formed by covering the front cover and the back cover of the housing body 302 with the front cover 303 and the back cover 304. With such a configuration, it is possible to mold both a front sub-passage groove 321 and a back sub-passage groove portion 331 as a part of the housing body 302 by using dies provided on both the surfaces of the housing body 302 at the time of molding the housing body 302 (a resin molding process).

The sub-passage grooves consist of the back sub-passage groove portion 331 formed on the back surface of the housing body 302 and the front sub-passage groove 321 formed on the surface of the housing body 302. The back sub-passage groove portion 331 has a first groove portion 332, a second groove portion 333 branching in the middle of the first groove portion 332, and a third groove portion 334 branching in the middle of the second groove portion 333.

The first groove portion 332 extends from one end portion 317 to another end portion 318 along the main flow direction of the measurement gas 30 at the distal end portion side of the housing body 302. The first groove portion 332 has a straight portion 332A extending from the inlet 311 of the one end portion 317 toward the other end portion 318 with a substantially constant cross-sectional shape and a throttle portion 332B whose groove width gradually narrows as advancing from the straight portion 332A to the first outlet 312 of the other end portion 318. The first groove portion 332 forms a first passage portion 701 (see FIG. 6B), which takes the measurement gas into the sub-passage and discharges dust and the like contained in the measurement gas, in cooperation with the back cover 304. The inlet 311 of the housing 301 serves as a first inlet 701a of the first passage portion 701 and the first outlet 312 of the housing 301 serves as a first outlet 701b of the first passage portion 701.

The second groove portion 333 branches from the straight portion 332A of the first groove portion 332, advances toward the proximal end portion side of the housing body 302 while curving, and is connected to a measurement flow path 341 provided at the central portion in the longitudinal direction of the housing body 302. In the second groove portion 333, a starting end portion is open in a side wall surface 332a positioned on the proximal end portion side of the housing body 302 between a pair of side wall surfaces forming the first groove portion 332, and a bottom wall surface 333a is continuous to be flush with a bottom wall surface 332b of the straight portion 332A of the first groove portion 332. The second groove portion 333 has a terminal end portion connected to the measurement flow path 341. The second groove portion 333 forms a second passage portion 702 (see FIG. 6B), which guides the measurement gas 30 to the flow detection unit 602 of the measurement flow path 341 to be discharged from the second outlet 313 to the outside of the housing 301, in cooperation with the back cover 304. The starting end portion of the second groove portion 333 serves as a second inlet 702a of the second passage portion 702.

As illustrated in FIG. 3C, a starting end portion 334a of the third groove portion 334 is open in an inner circumferential fold 333b of the second groove portion 333. The third groove portion 334 is provided so as to extend from the starting end portion 334a open at the second groove portion 333 toward the one end portion 317 of the housing 301. A terminal end portion 334b of the third groove portion 334 is provided at a position closer to the one end portion 317 of the housing 301 than the starting end portion 334a, and a drain hole 314 open at the back cover 304 is arranged so as to oppose the terminal end portion 334b. A bottom fold surface 334c of the third groove portion 334 is continuous to be flush with the bottom wall surface 333a of the second groove portion 333.

The third groove portion 334 is provided with an enlarged portion with a larger groove width W than the starting end portion 334a at a position between the starting end portion 334a and the terminal end portion 334b of the third groove portion 334, and a buffer chamber having a predetermined indoor space is formed by being covered with the back cover 304. The third groove portion 334 forms a third passage portion 703 which discharges water droplets that has entered the sub-passage (see FIG. 6B) in cooperation with the back cover 304. The starting end portion 334a of the third groove portion 334 serves as a third inlet 703a of the third passage portion 703 and the drain hole 314 of the back cover 304 serves as a third outlet 703b of the third passage portion 703.

The third groove portion 334 has a protruding portion 334d arranged at the position between the starting end portion 334a and the terminal end portion 334b. The protruding portion 334d has an abruptly-reduced structural portion 704a that reduces a sectional area of the third passage portion 703 in a stepwise manner. The protruding portion 334d is provided at a position closer to the terminal end portion 334b than a center position between the starting end portion 334a and the terminal end portion 334b, and is provided in the vicinity of the terminal end portion 334b in the present embodiment. A size of the protruding portion 334d is set such that the sectional area of the reduced portion of the third passage portion 703 is larger than the opening area of the drain hole 314 of the back cover 304.

The measurement flow path 341 is formed to penetrate through the housing body 302 in the thickness direction, and a flow path exposure portion 430 of the circuit package 400 is arranged to protrude. In the measurement flow path 341, the other end of the second groove portion 333 is open to the other end portion 318 side of the housing body 302 of the flow path exposure portion 430 of the circuit package 400. The second groove portion 333 has a shape in which a groove depth becomes deeper as approaching the measurement flow path 341, and in particular, has an abruptly-inclined portion 333d which abruptly becomes deep in front of the measurement flow path 341. The abruptly-inclined portion 333d functions to cause a gas of the measurement gas 30 to pass through a front surface 431 side where a flow detection unit 602 is provided between the front surface 431 and a back surface 432 of the flow path exposure portion 430 of the circuit package 400 in the measurement flow path 341 and cause foreign matters such as dust contained in the measurement gas 30 to pass through the back surface 432 side.

The measurement gas 30 gradually moves in a direction of the front side (the back side of the drawing in FIG. 3B) of the housing 301 as flowing inside the second groove portion 333. Further, a part of air having a small mass moves along the abruptly-inclined portion 333d and flows toward the front surface 431 of the flow path exposure portion 430 in the measurement flow path 341. On the other hand, it is difficult for the foreign matter having a large mass to rapidly change the course due to a centrifugal force, and thus, the foreign matter hardly flows along the abruptly-inclined portion 333d but flows toward the back surface 432 of the flow path exposure portion 430 in the measurement flow path 341.

The flow detection unit 602 is provided on the front surface 431 of the flow path exposure portion 430 of the circuit package 400. In the flow detection unit 602, heat transfer is conducted with the measurement gas 30 flowing toward the front surface 431 of the flow path exposure portion 430, thereby measuring the flow rate. When passing through the front surface 431 side and the back surface 432 side of the flow path exposure portion 430 of the circuit package 400, the measurement gas 30 flows from the measurement flow path 341 on the one end portion 317 side of the housing 301 into the front sub-passage groove 321, flows inside the front sub-passage groove 321, and is discharged from the second outlet 313 to the main passage 124.

As illustrated in FIG. 3A, one end of the front sub-passage groove 321 is open to the measurement flow path 341 on the one end portion 317 side of the housing 301. Further, the other end of the front sub-passage groove 321 communicates with the second outlet 313 of the other end portion 318 of the housing 301. The front sub-passage groove 321 has such a shape as to curve to gradually advance toward the other end portion 318 as proceeding from the measurement flow path 341 to the distal end portion side of the housing 301 and to linearly extend toward the downstream side in the main flow direction of the measurement gas 30 at the distal end portion of the housing 301.

In the present embodiment, a flow path formed by the back sub-passage groove portion 331 is directed from the distal end portion side to the proximal end portion side of the housing 301 while drawing a curve, and the measurement gas 30 flowing through the sub-passage becomes flow in a reverse direction with respect to the main flow direction of the main passage 124 at a position closest to the flange 305. Further, the back sub-passage provided on the back surface side of the housing 301 in a portion of the flow in the reverse direction is connected to the front sub-passage provided on the front surface side.

The measurement flow path 341 is divided into a space on the front surface 431 side and a space on the back surface 432 side by the flow path exposure portion 430 of the circuit package 400 and is not divided by the housing body 302. That is, the measurement flow path 341 is formed to penetrate through the front surface and the back surface of the housing body 302, and the circuit package 400 is arranged so as to protrude in a cantilever manner in this one space. With such a configuration, it is possible to mold the sub-passage grooves on the front and back surfaces of the housing body 302 in the single resin molding process, and it is possible to mold a structure, which connects the sub-passage grooves of the front and back surfaces, together by the measurement flow path 341. Incidentally, the circuit package 400 is embedded and fixed to fixing portions 351, 352, and 353 of the housing body 302 by resin molding.

In addition, the circuit package 400 can be inserted and mounted on the housing body 302 at the same time as the resin molding of the housing body 302 according to the above-described configuration. Incidentally, any one of the one end portion side and the other end portion side of the housing 301 with respect to the circuit package 400 is configured to penetrate through the housing 301 in the width direction (the second direction 51), and thus, it is also possible to mold the sub-passage shape connecting the back sub-passage groove portion 331 and the front sub-passage groove 321 by the single resin molding process.

A front sub-passage of the housing 301 is formed by close contact between an upper end portion of an upper side wall in a groove height direction of a pair of side wall surfaces forming the front sub-passage groove 321 and the back surface of the front cover 303. Further, a back sub-passage of the housing 301 is formed by close contact between an upper end portion of an upper side wall in the groove height direction of a pair of side wall surfaces forming the back sub-passage groove portion 331 and the back surface of the back cover 304.

As illustrated in FIGS. 3A and 3B, a cavity portion 342 is formed between the flange 305 and a portion where the sub-passage groove is formed in the housing body 302. The cavity portion 342 is formed by penetrating through the housing body 302 in the thickness direction. A terminal connection portion 320, which connects a connecting terminal 412 of the circuit package 400 and an inner end 306a of an external terminal of the external connection portion 306, is arranged to be exposed in the cavity portion 342. The connecting terminal 412 and the inner end 306a are electrically connected by spot welding, laser welding, or the like. The cavity portion 342 is blocked by attaching the front cover 303 and the back cover 304 to the housing body 302, and the periphery of the cavity portion 342 is sealed by laser welding with the front cover 303 and the back cover 304.

Figure 4A:
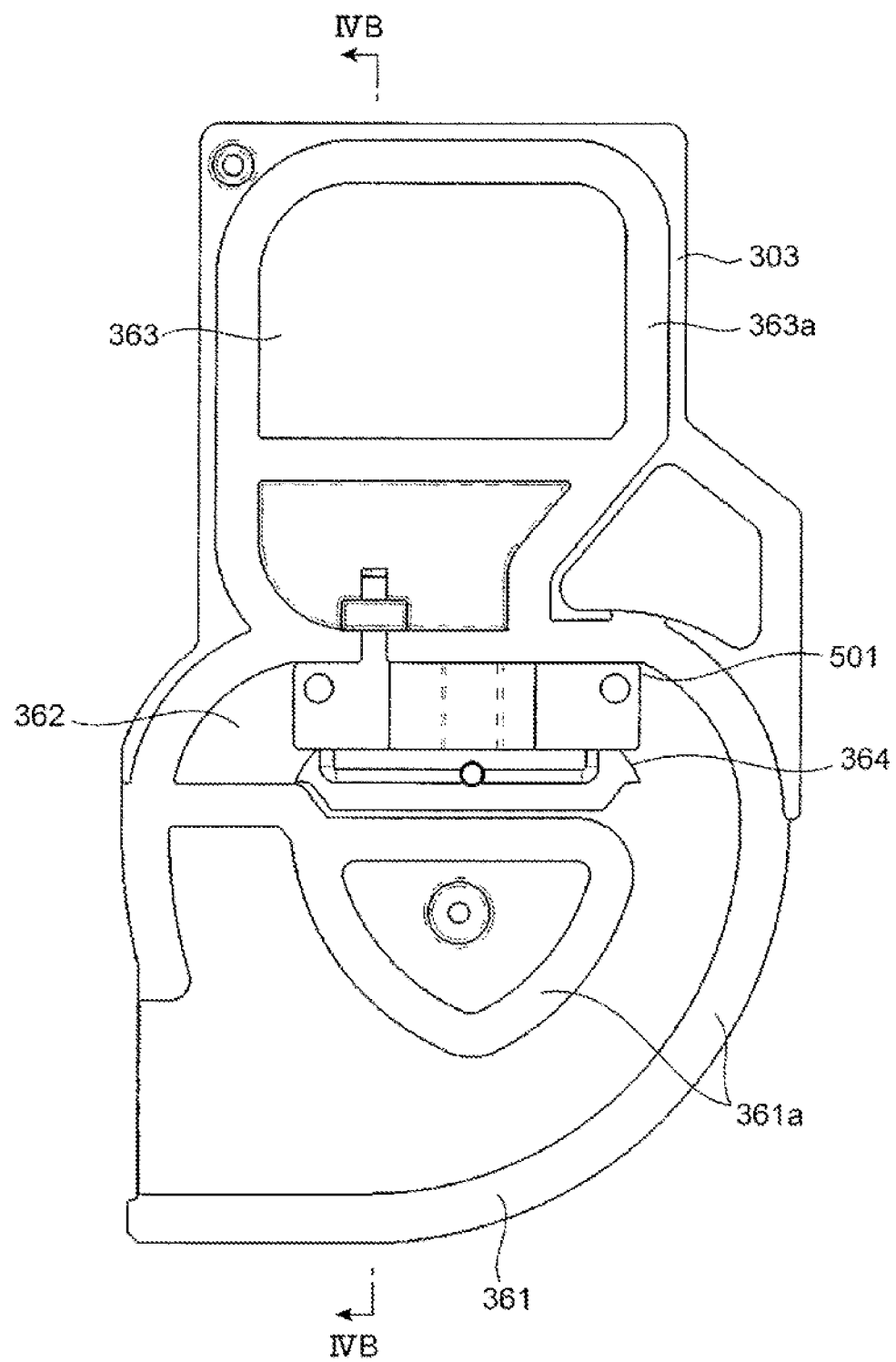
FIG. 4A is a rear view of a front cover.
Figure 4B:
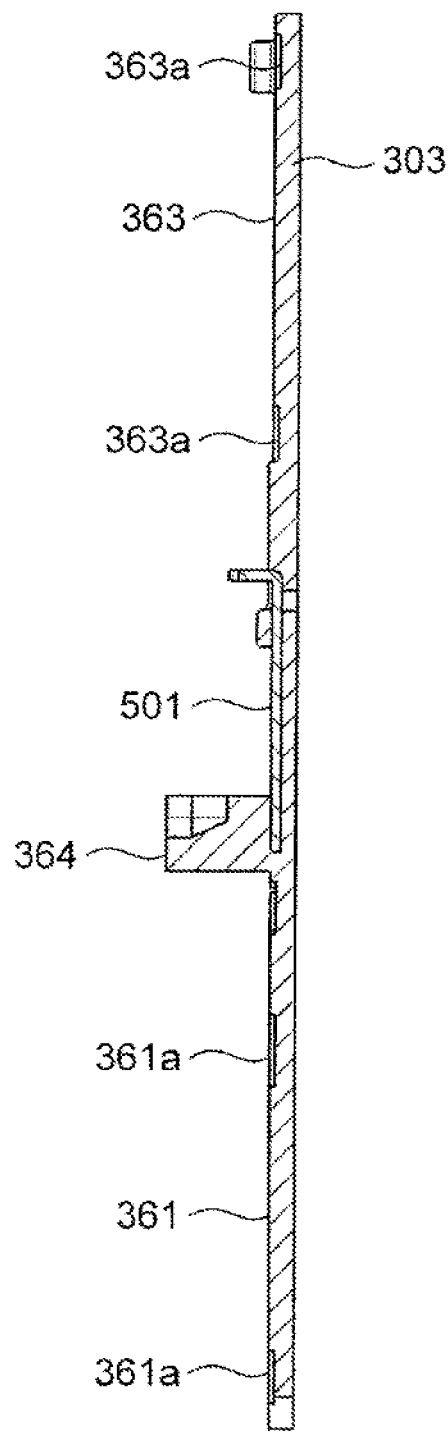
FIG. 4B is a cross-sectional view taken along the line IVB-IVB of FIG. 4A.

FIG. 4A is a rear view of the front cover, and FIG. 4B is a cross-sectional view taken along the line IVB-IVB of FIG. 4A. The front cover 303 and the back cover 304 are attached to the front surface and the rear surface of the housing body 302, respectively, and form the sub-passage in cooperation with the front sub-passage groove 321 and the back sub-passage groove portion 331. The front cover 303 and the back cover 304 have a thin plate shape with a wide cooling surface. Thus, the thermal flowmeter 300 has an effect that air resistance is reduced and the thermal flowmeter 300 is easily cooled by the measurement gas 30 flowing through the main passage 124.

The front cover 303 has a size that covers the front surface of the housing body 302. A fifth region 361 blocking the front sub-passage groove 321 of the housing body 302, a sixth region 362 blocking the front side of the measurement flow path 341 of the housing body 302, and a seventh region 363 blocking the front side of the cavity portion 342 are formed on the back surface of the front cover 303. Further, concave portions 361a into which a side wall upper end portion of the front sub-passage groove 321 of the housing body 302 is inserted are recessed on both sides in the width direction of the fifth region 361 and the sixth region 362. In addition, a concave portion 363a into which a front outer circumferential end portion of the cavity portion 342 is inserted is recessed around the seventh region 363.

Further, a convex portion 364 to be inserted into a gap between a distal end of the flow path exposure portion 430 of the circuit package 400 and the measurement flow path 341 of the housing body 302 is provided on the back surface of the front cover 303. In addition, a metal plate 501 is provided by insert molding at a position of the circuit package 400 opposing the front surface 431 of the flow path exposure portion 430.

Figure 5A:
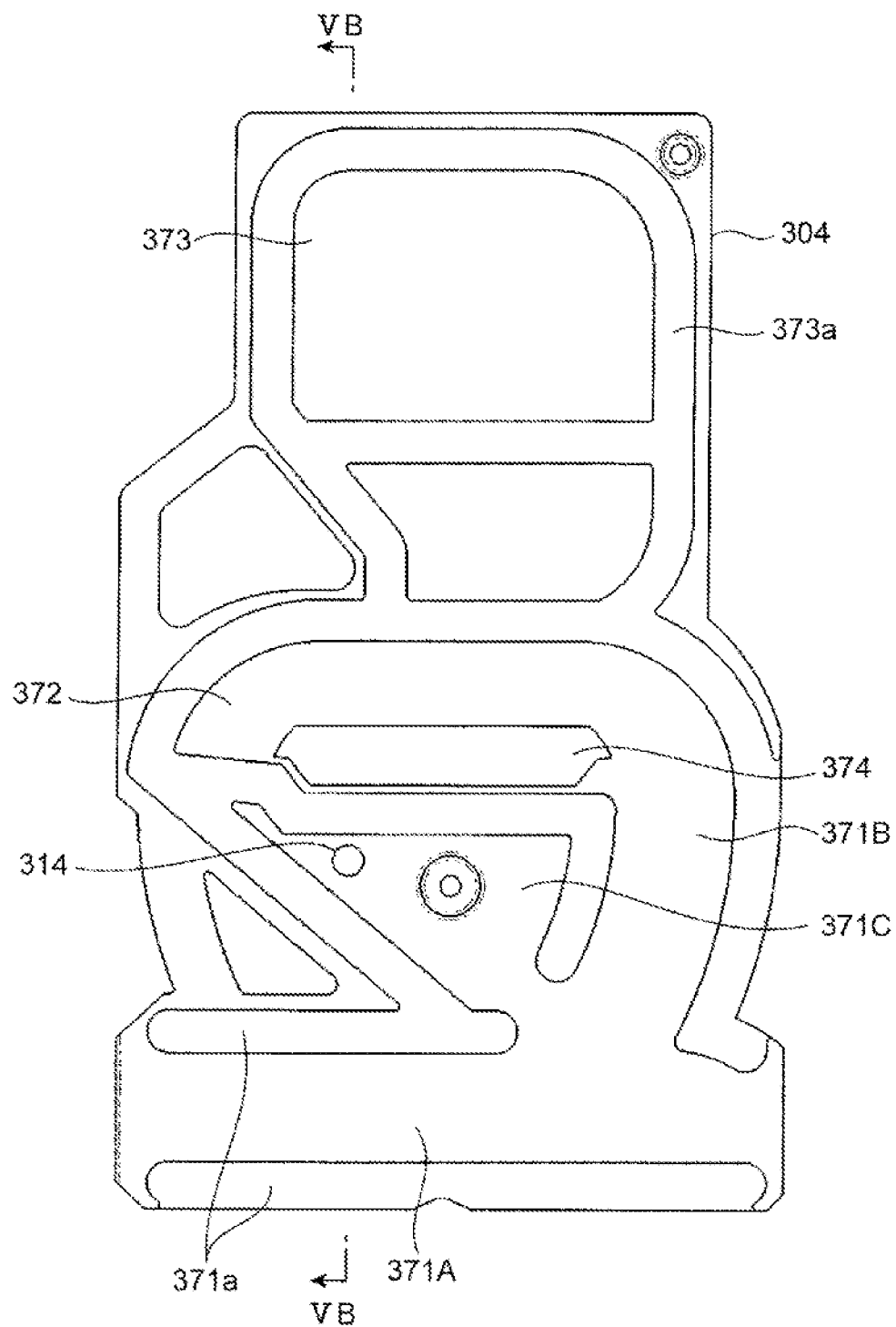
FIG. 5A is a rear view of a back cover.
Figure 5B:
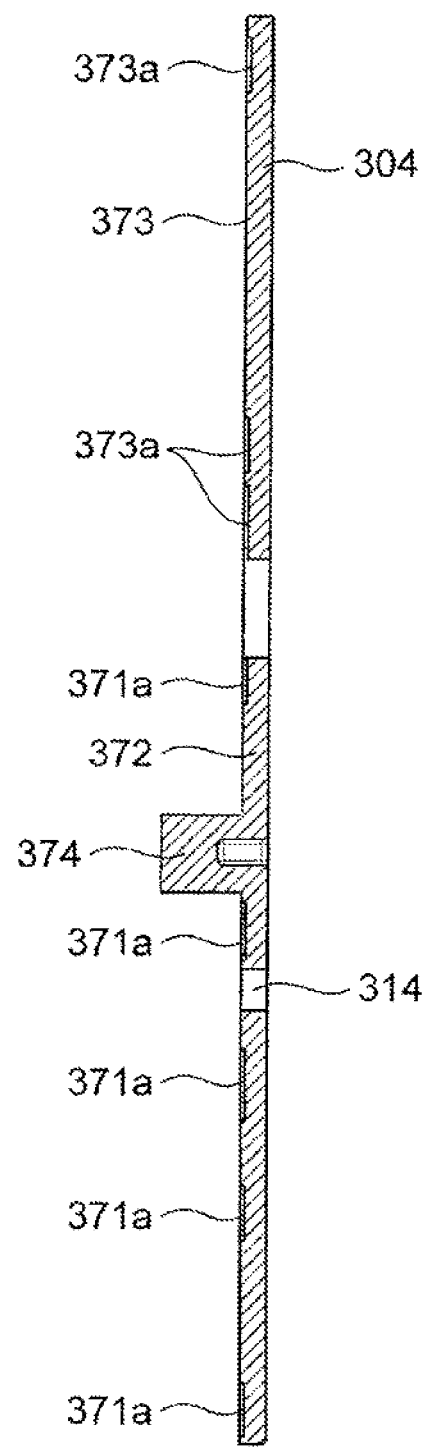
FIG. 5B is a cross-sectional view taken along the line VB-VB of FIG. 5A.

FIG. 5A is a rear view of the back cover, and FIG. 5B is a cross-sectional view taken along the line VB-VB of FIG. 5A. The back cover 304 has a size that covers the back surface of the housing body 302. A first region 371A blocking the first groove portion 332 of the back sub-passage groove portion 331 of the housing body 302, a second region 371B blocking the second groove portion 333, a third region 371C blocking the third groove portion 334, a fourth region 372 blocking the back side of the measurement flow path 341 of the housing body 302, and a fifth region 373 blocking the back side of the cavity portion 342 are formed on the back surface of the back cover 304. Further, a concave portion 371a into which a side wall upper end portion of the back sub-passage groove portion 331 of the housing body 302 is inserted is recessed in both sides in the width direction of the first region 371A, the second region 371B, and the fourth region 372 and around the third region 371C. In addition, a concave portion 373a into which a back outer circumferential end portion of the cavity portion 342 is inserted is recessed around the fifth region 373.

A convex portion 374 to be inserted into a gap between a distal end of the flow path exposure portion 430 of the circuit package 400 and the measurement flow path 341 of the housing body 302 is provided on the back surface of the back cover 304. The convex portion 374 embeds the gap between the distal end of the flow path exposure portion 430 of the circuit package 400 and the measurement flow path 341 of the housing body 302 in cooperation with the convex portion 364 of the front cover 303.

The drain hole 314 communicating with the sub-passage is bored in the back cover 304. The drain hole 314 is formed so as to penetrate through the third region, which blocks the third groove portion 334 of the housing body 302 in a state where the back cover 304 is attached to the housing body 302, and can discharge a liquid that has been taken into the third passage portion 703 inside the sub-passage to the outside of the housing 301.

Figure 6A:
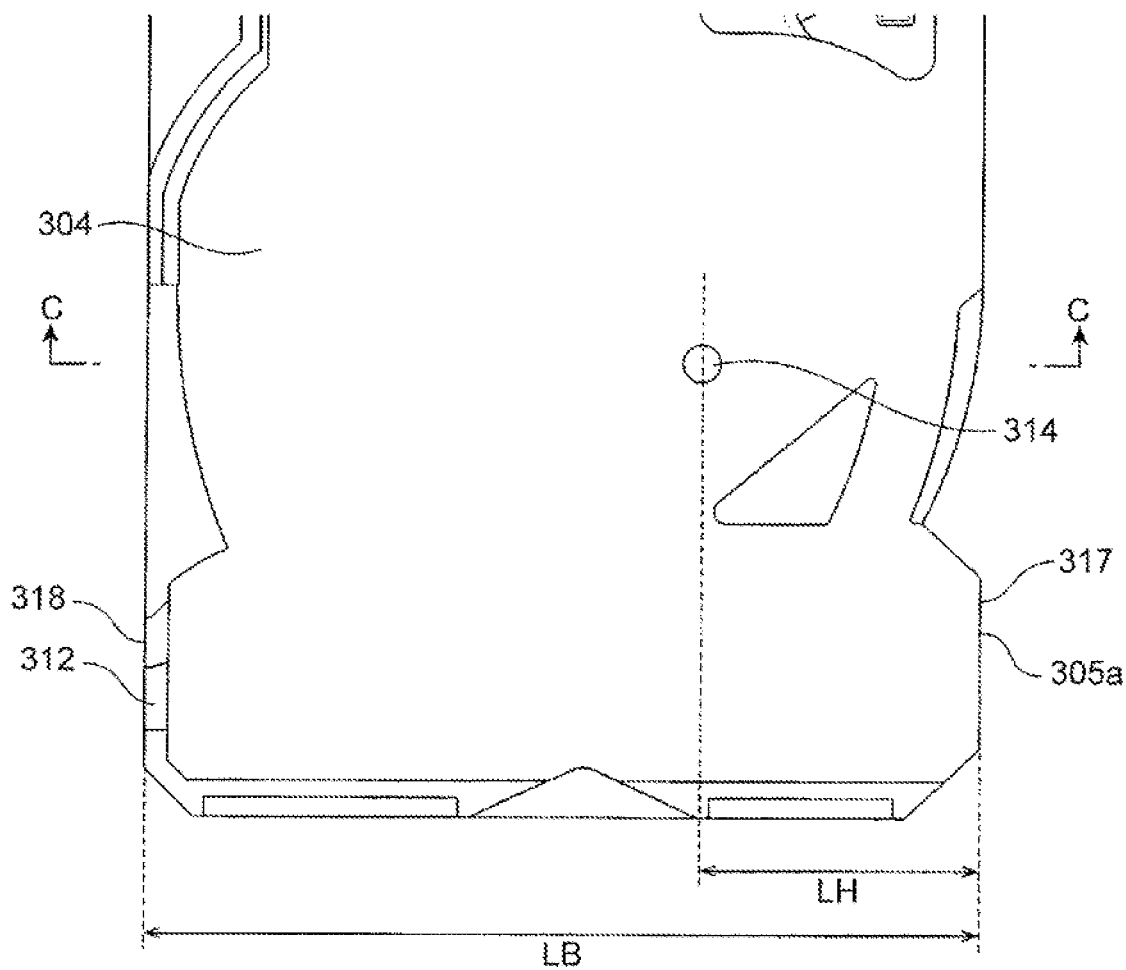
FIG. 6A is a view for describing a drainage structure of a thermal flowmeter according to the present invention.
Figure 6B:
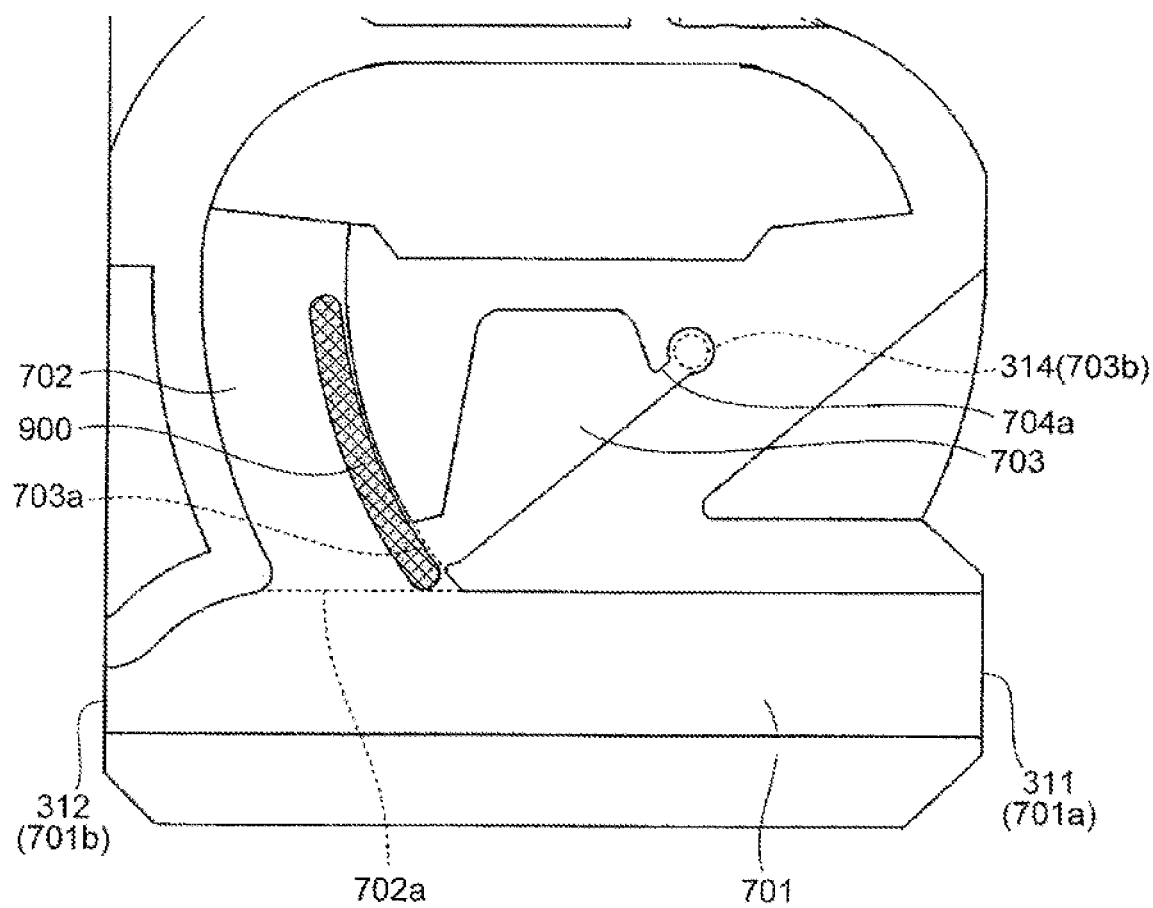
FIG. 6B is a view for describing a drainage structure of a thermal flowmeter according to the present invention.
Figure 6C:
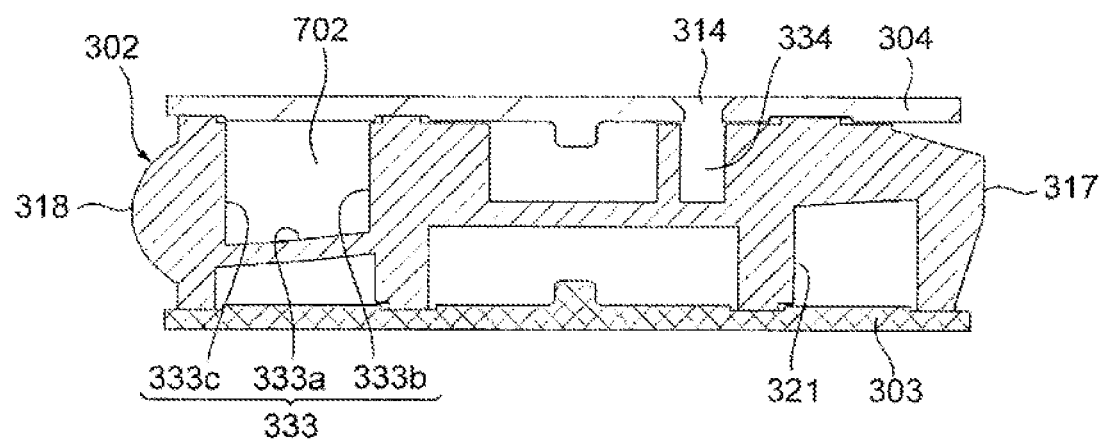
FIG. 6C is a cross-sectional view taken along the line C-C of FIG. 6A.

FIG. 6A is an enlarged view of a main part of the thermal flowmeter according to the present invention, FIG. 6B is a view obtained by omitting the back cover 304 in FIG. 6A, and FIG. 6C is a cross-sectional view taken along the line C-C of FIG. 6A.

The sub-passage of the housing 301 has the first passage portion 701 communicating between the inlet 311 of the housing 301 and the first outlet 312, the second passage portion 702 communicating between the second inlet 702a open to the first passage portion 701 and the second outlet 313 via the measurement flow path 341, and the third passage portion 703 communicating between the third inlet 703a open to the second passage portion 702 and the third outlet 703b open to the back cover 304.

The first passage portion 701 is formed by covering the first groove portion 332 (see FIG. 3B) of the housing 301 with the first region 371A (see FIG. 5A) of the back cover 304, and the second passage portion 702 is formed by covering the second groove portion 333 (see FIG. 3B) of the housing 301 with the second region 371B (see FIG. 5A) of the back cover 304. Further, the third passage portion 703 is formed by the third groove portion 334 (see FIG. 3B) of the housing 301 with the third region 371C (see FIG. 5A) of the back cover 304.

The first passage portion 701 takes a part of the measurement gas 30 flowing through the main passage 124 from the inlet 311 and discharges the taken measurement gas 30 from the first outlet 312 to the main passage 124. The second passage portion 702 takes a part of the measurement gas 30 from the first passage portion 701 and guides the taken measurement gas 30 to the flow detection unit 602 provided in the measurement flow path 341. The measurement gas 30 that has passed through the flow detection unit 602 flows from the measurement flow path 341 into the front sub-passage, passes through the front sub-passage, and is discharged to the outside from the second outlet 313. The third passage portion 703 takes a part of the measurement gas 30 from the second passage portion 702 and discharges the taken measurement gas 30 to the outside from the drain hole 314.

The second passage portion 702 branches with a predetermined angle with respect to the first passage portion 701 at the second inlet 702a. Therefore, a separation flow is generated in the vicinity of the second inlet 702a of the second passage portion 702. Therefore, the flow velocity in the vicinity of the inner circumferential wall 333b of the second inlet 702a decreases to form a low-speed portion 900 in the second passage portion 702 as illustrated in FIG. 6B. The third inlet 703a of the third passage portion 703 is arranged at the low-speed portion 900 of the separation flow generated at the second inlet 702a of the second passage portion 702. Therefore, the amount of air flowing into the third passage portion 703 is small, and most of the air flows into the second passage portion 702. As a result, it is possible to suppress deterioration in measurement accuracy of the flow detection unit 602 accompanying a decrease in the flow rate.

In addition, when the flow velocity is relatively high, the first passage portion 701 extending in a straight line can discharge water droplets and foreign matters contained in the measurement gas by using the inertia of the measurement gas 30. However, when the flow velocity decreases, the inertial force is weak, and the effect thereof is reduced. In particular, water droplets adhere to a wall surface and a liquid film is likely to be generated in the low-speed portion 900 in the separation portion generated at the branch portion between the first passage portion 701 and the second passage portion 702 in the sub-passage. As the liquid film grows, a liquid film height increases and gradually moves toward an air flow direction over the wall surface due to the inertia of air.

On the other hand, in the present embodiment, the third inlet 703a of the third passage portion 703 is open to the inner circumferential wall 333b of the second groove portion 333 forming the second passage portion 702. Therefore, a liquid film can be positively caused to flow from the second passage portion 702 into the third passage portion 703 so that the liquid film is prevented from entering the second passage portion 702 to the flow detection unit 602 side, and it is possible to suppress deterioration in measurement accuracy at the flow detection unit 602.

The third passage portion 703 is formed to be obliquely inclined so as to proceed from the distal end portion side to the proximal end portion side as proceeding from the other end portion 318 side toward the one end portion 317 side of the housing 301. Therefore, for example, when there is no flow of air due to an engine operation stop in a case where the proximal end portion and the distal end portion of the housing 301 are attached to the main passage 124 in a posture state of being vertically arranged, it is possible to cause water droplets inside the third passage portion 703 to move by its own weight and to be returned from the third inlet 703a to the second passage portion 702, and it is possible to prevent the water droplets from staying in the third passage portion 703.

As illustrated in FIG. 6C, the drain hole 314 is formed to penetrate through the back cover 304. Further, the drain hole 314 is arranged at a position opposing the third groove portion 334 of the housing body 302 and communicates between the third groove portion 334 and the outside of the housing 301.

The one end portion 317 of the housing 301 is orthogonal to the front and back surfaces of the housing 301, that is, the front cover 303 and the back cover 304. Therefore, as the measurement gas 30 flowing in the main flow direction of the main passage 124 collides with the one end portion 317, a separation flow flowing in a direction away from the front cover 303 and the back cover 304 is generated on the front surface side and the back surface side of the housing 301. A thickness of flow velocity distribution of the separation flow gradually increases as advancing in the main flow direction of the measurement gas 30 from the one end portion 317, which is a separation starting point.

Therefore, a static pressure generated at a position outside the housing 301 and closer to the one end portion 317 side of the housing 301 than the drain hole 314 is lower than a static pressure at the terminal end portion of the third groove portion 334 to be a negative pressure, and air flow passing through the drain hole 314 from the terminal end portion of the third groove portion 334 can be generated by such a pressure difference. Therefore, it is possible to discharge the liquid (liquid film) flowing into the third passage portion 703 to the main passage 124 which is the outside of the housing 301.

Since the flow rate of the separation flow is the fastest at the separation starting point, the negative pressure effect increases as the distance between the one end portion 317 of the housing 301 and the drain hole 314 is short. Therefore, the position of the drain hole 314 is preferably close to the one end portion 317 of the housing 301. For example, as illustrated in FIG. 6A, it is preferable to set a distance LH from the one end portion 317 of the housing 301 to the drain hole 314 to be equal to or less than a half of a distance LB from the one end portion 317 to the other end portion 318 of the housing 301.

Figure 7B:
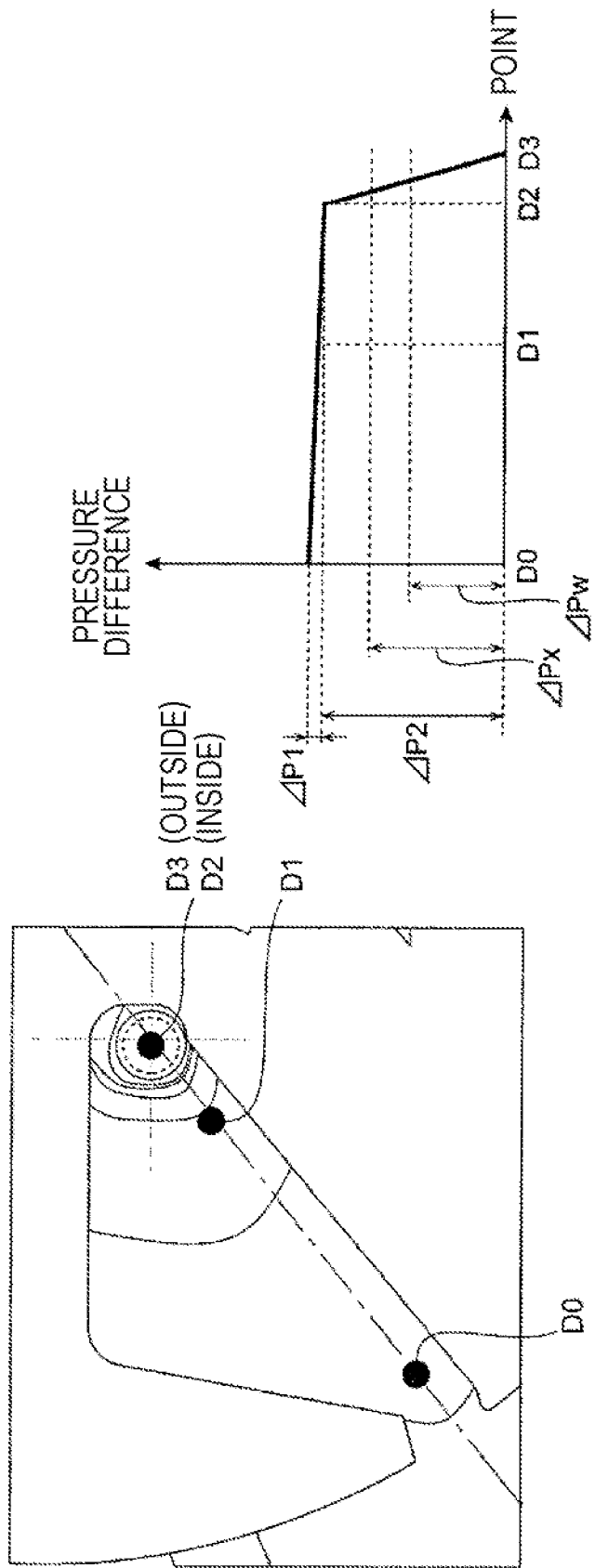
FIG. 7B is a view illustrating a pressure gradient inside a third passage portion having no pressure loss generation means.

FIG. 7A is a view illustrating a pressure gradient inside the third passage portion 703 that has the abruptly-reduced structural portion 704a and FIG. 7B is a view illustrating a pressure gradient inside the third passage portion 703 that does not have the abruptly-reduced structural portion 704a. In FIGS. 7A and 7B, thin lines in the drawing represent pressure contour lines.

As illustrated in FIG. 7B, when the third passage portion 703 does not have the abruptly-reduced structural portion 704a, the pressure gradient becomes steep in the vicinity of the third outlet 703b which is the drain hole 314. Therefore, the water droplets flowing into the third passage portion 703 is discharged from the third outlet 703b as the water level rises to the vicinity of the third outlet 703b which is the drain hole 314.

Therefore, when a pressure difference ΔP1 is small up to the vicinity of the third outlet 703b, it is difficult for the water droplets to reach the third outlet 703b. In addition, when a pressure difference ΔP2 from the vicinity of the third outlet 703b of the third passage portion 703 to the outside of the third outlet 703b is large, that is, when the pressure difference between the inside and the outside of the third outlet 703b is large, there is a risk that a large amount of water droplets may flow into the third outlet 703b at once when the water droplets reach the vicinity of the third outlet 703b so that the inflow amount exceeds the discharge capacity of the third outlet 703b. In such a case, there is a concern that the water droplets that have not been drawn into the third passage portion 703 may overflow inside the second passage portion 702 and affect the flow detection unit 602 of the second passage portion 702.

The present invention has been made in view of such problems, and the abruptly-reduced structural portion 704a is provided as a pressure loss generation means in the third passage portion 703. The abruptly-reduced structural portion 704a is provided between the third inlet 703a and the third outlet 703b of the third passage portion 703 such that the sectional area of the third passage portion 703 is reduced in a stepwise manner. In the present embodiment, the abruptly-reduced structural portion 704a is provided at a position biased toward the third outlet 703b side of the center position between the third inlet 703a and the third outlet 703b of the third passage portion 703, and particularly, is provided at a position close to the third outlet 703b. The abruptly-reduced structural portion 704a can generate a pressure loss by generating a separation flow in a fluid such as air and water droplets flowing from the third inlet 703a of the third passage portion 703 toward the drain hole 314 which is the third outlet 703b. Further, the pressure gradient in the vicinity of the third outlet 703b can be reduced by the pressure loss generated in the vicinity of the abruptly-reduced structural portion 704a. Therefore, it is possible to limit the amount of water droplets flowing out to the third outlet 703b.

For example, when the third passage portion 703 does not have the abruptly-reduced structural portion 704a, the pressure gradient is obtained such that the pressure difference of $\Delta P2$ is larger as illustrated in FIG. 7B in a case where the pressure difference from the third inlet 703a to a portion immediately before the third outlet 703b of the third passage portion 703 is $\Delta P1$ and the pressure difference between the inside and outside of the drain hole 314, that is, between the sub-passage and the main passage 124 is $\Delta P2$. When a pressure difference for discharge of the minimum amount of water that does not allow water droplets to enter the second passage portion 702 is $\Delta Pw$ and a pressure difference as a water discharge capacity limit of the third outlet 703b is $\Delta Px$, $\Delta P2 > \Delta Pw$ is satisfied, and the pressure difference necessary to drain water is obtained. However, since $\Delta P2 > \Delta Px$ is satisfied, there is a concern that it is difficult to draw water into the third passage portion 703, for example, when water, an amount of which exceeds the water discharge capacity limit, flows into the drain hole 314 at once so that water droplets enter the second passage portion 702 and affects the flow detection unit 602.

On the other hand, the sectional area of the passage is reduced in a stepwise manner by the abruptly-reduced structural portion 704a so that the separation flow is generated in the water droplets between the abruptly-reduced structural portion 704a and the third outlet 703b in the present embodiment. Therefore, a pressure difference $\Delta P1'$ becomes larger than $\Delta P1$, and the water droplets are easily guided to the third outlet 703b. Further, a pressure difference $\Delta P2'$ between the inside and outside of the drain hole 314, which is the third outlet 703b, is smaller than $\Delta P2$, the magnitude relationship of $\Delta P2' > \Delta Pw$ is maintained to obtain the pressure difference necessary for discharge of water, and it is possible to suppress the inflow of water droplets more than the discharge capacity limit of the drain hole 314 as $\Delta P2' < \Delta Px$. Therefore, it is possible to prevent deterioration in a force of drawing the water droplets into the third passage portion 703 caused by clogging of the drain hole 314, to prevent the water droplets that have not been drawn into the third passage portion 703 from entering the second passage portion 702, and to reduce the influence on the flow detection unit.

Although the abruptly-reduced structural portion 704a is formed in the vicinity of the third outlet 703b in the present embodiment, it suffices if the abruptly-reduced structural portion 704a is provided inside the third passage portion 703 except for the change in the sectional area of the third outlet 703b itself. Therefore, for example, the abruptly-reduced structural portion 704a may be provided in the vicinity of the first inlet 703a of the third passage portion 703. In addition, the description has been given in the present embodiment regarding the configuration in which the abruptly-reduced structural portion 704a is provided only on one side in the groove width direction of the second groove portion 333 forming the third passage portion 703, but the abruptly-reduced structural portion 704a may be provided to be reduced in a stepwise manner not only from one side but also from both the sides of the second groove portion 333. In addition, both the sides in the groove width direction may communicate with each other unless the height direction of the third passage portion 703 is communicated.

Further, the area other than the passage sectional area before and after the abruptly-reduced structural portion 704a may be constant or inconstant. In addition, the abruptly-reduced structural portion 704a is not limited to the configuration of being provided in the housing body 302, and may be configured to protrude from the back cover 304. Further, the abruptly-reduced structural portion 704a is not limited to the shape of being reduced in a stepwise manner, but may be a gently reduced shape, and the number of the abruptly-reduced structural portions 704a is not limited to one but may be plural.

Further, it is desirable to set the position of the abruptly-reduced structural portion 704a in the vicinity of the third outlet 703b since it is effective to change the pressure gradient immediately before the third outlet 703b and to obtain buffer performance of storing water by securing the capacity of the third passage portion 703 as much as possible up to the vicinity of the third outlet 703b of the third passage portion 703.

According to the present invention, the abruptly-reduced structural portion 704a is provided, as the pressure loss generation means, between the third inlet 703a and the third outlet 703b of the third passage portion 703. thus, it is possible to effectively guide the water droplets, which have been drawn into the third passage portion 703 and directed toward the third outlet 703b as the drain hole 314, to the third outlet 703b using the pressure gradient caused by generation of the pressure loss before and after the abruptly-reduced structural portion 704a. In addition, since the pressure gradient in the vicinity of the third outlet 703b of the third passage portion 703 can be reduced, it is possible to discharge the water without exceeding the water discharge capacity limit of the drain hole 314, to prevent the water droplets that have not been discharged from entering the second passage portion 702, and to protect the flow detection unit 602 of the second passage portion 702 from the water droplets.

Second Embodiment

Figure 8A:
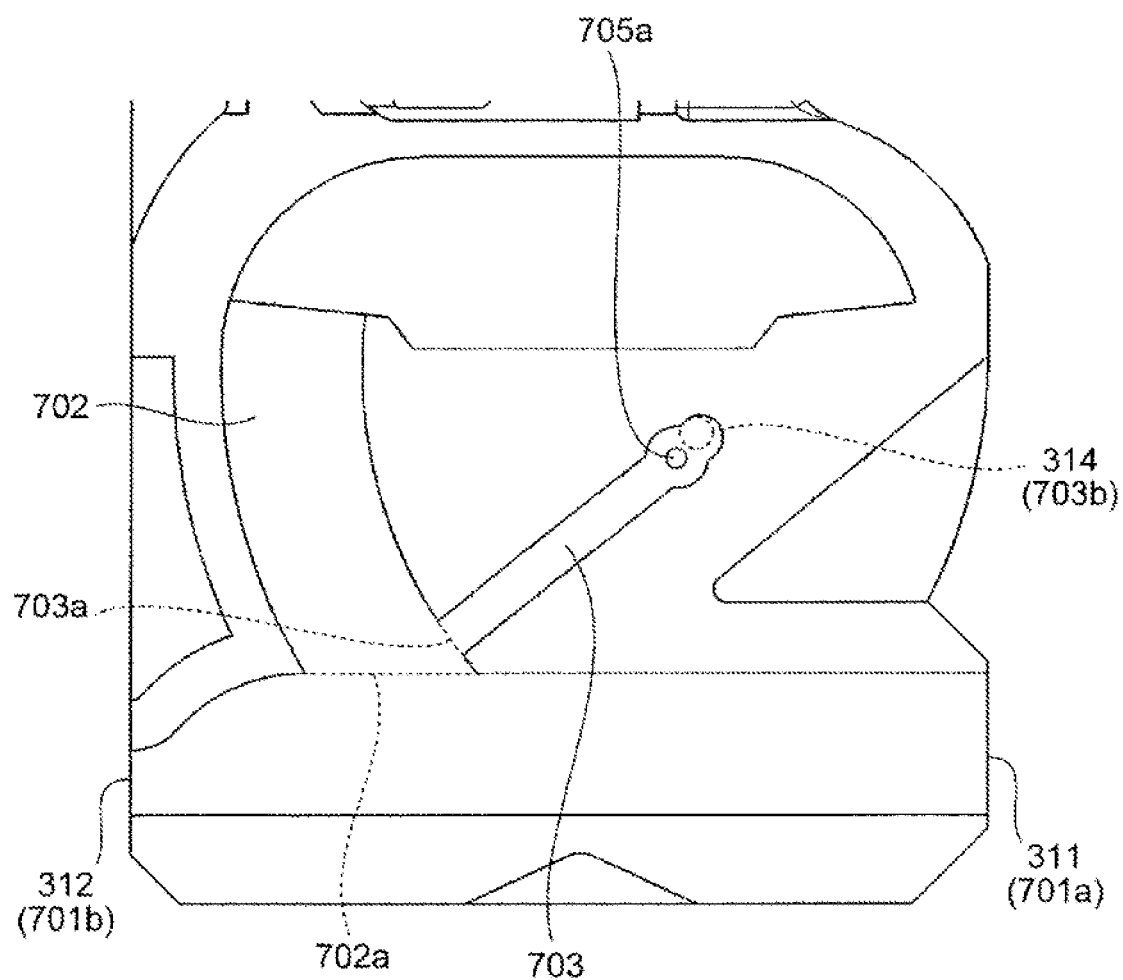
FIG. 8A is a view illustrating a specific example of a thermal flowmeter according to a second embodiment.
Figure 8B:
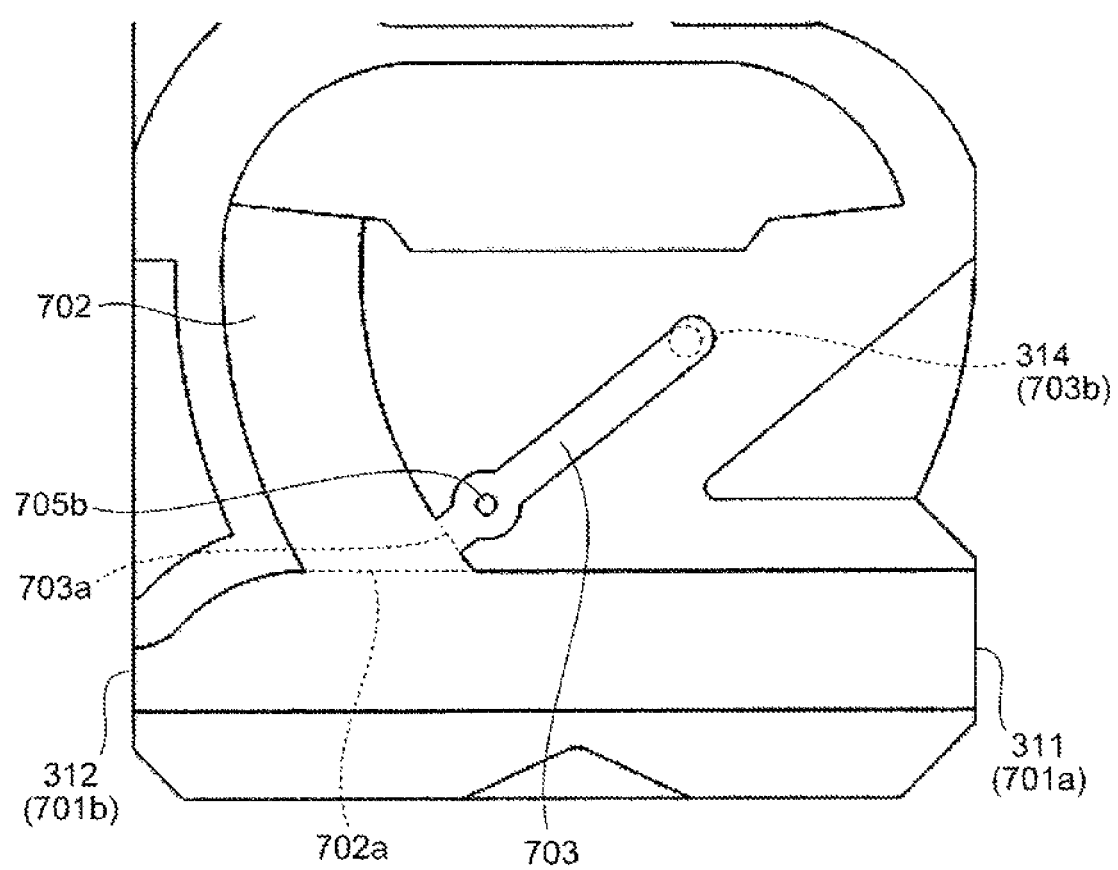
FIG. 8B is a view illustrating a specific example of the thermal flowmeter according to the second embodiment.

Next, a second embodiment of the present invention will be described. FIGS. 8A and 8B are views for describing specific examples of a thermal flowmeter according to the second embodiment.

A characteristic point of the present embodiment is that a pressure loss generation means is configured using a passage resistance structural portion. Incidentally, constituent elements which are the same as those of the first embodiment will be denoted by the same reference signs, and a detailed description thereof will be omitted.

In the example illustrated in FIG. 8A, a passage resistance structural portion 705a is provided in the vicinity of the third outlet 703b of the third passage portion 703. The passage resistance structural portion 705a has a columnar shape with a circular cross section protruding from a bottom wall surface of the third groove portion 334.

The third passage portion 703 extends from the third inlet 703a toward the third outlet 703b with a constant sectional area. The third passage portion 703 has a shape that bulges in the groove width direction along a shape of the passage resistance structural portion 705a at a place where the passage resistance structural portion 705a is provided, in order to prevent the sectional area being changed by the passage resistance structural portion 705a.

The passage resistance structural portion 705a can generate a pressure loss by generating a separation flow in a fluid such as air and water droplets flowing from the third inlet 703a of the third passage portion 703 toward the drain hole 314 which is the third outlet 703b. Further, the pressure gradient in the vicinity of the third outlet 703b can be reduced by the pressure loss generated in the vicinity of the passage resistance structural portion 705a. Therefore, it is possible to effectively guide the water droplets, which have been drawn into the third passage portion 703 and directed toward the third outlet 703b as the drain hole 314, to the third outlet 703b using the pressure gradient caused by generation of the pressure loss before and after the passage resistance structural portion 705a. In addition, since the pressure gradient in the vicinity of the third outlet 703b of the third passage portion 703 can be reduced, it is possible to discharge the water without exceeding the water discharge capacity limit of the drain hole 314, to prevent the water droplets that have not been discharged from entering the second passage portion 702, and to protect the flow detection unit 602 of the second passage portion 702 from the water droplets.

Although the passage resistance structural portion 705a is provided in the vicinity of the third outlet 703b in the example illustrated in FIG. 8A, it suffices if the passage resistance structural portion 705a is provided between the third inlet 703a and the third outlet 703b of the third passage portion 703. As illustrated in FIG. 8B, a passage resistance structural portion 705b may be provided in the vicinity of the third inlet 703a of the third passage portion 703. In addition, a cross-sectional shape of the passage resistance structural portion 705a or 705b is not necessarily circular, and the passage sectional area of the third passage portion 703 may be changed by the passage resistance structural portion 705a or 705b. Further, the passage resistance structural portion 705a or 705b may be provided on the back cover 304 or may be installed in plural. Further, it is desirable to set a position of the passage resistance structural portion 705a or 705b in the vicinity of the third outlet 703b since it is most effective to change the pressure gradient immediately before the third outlet 703b.

Third Embodiment

Figure 9A:
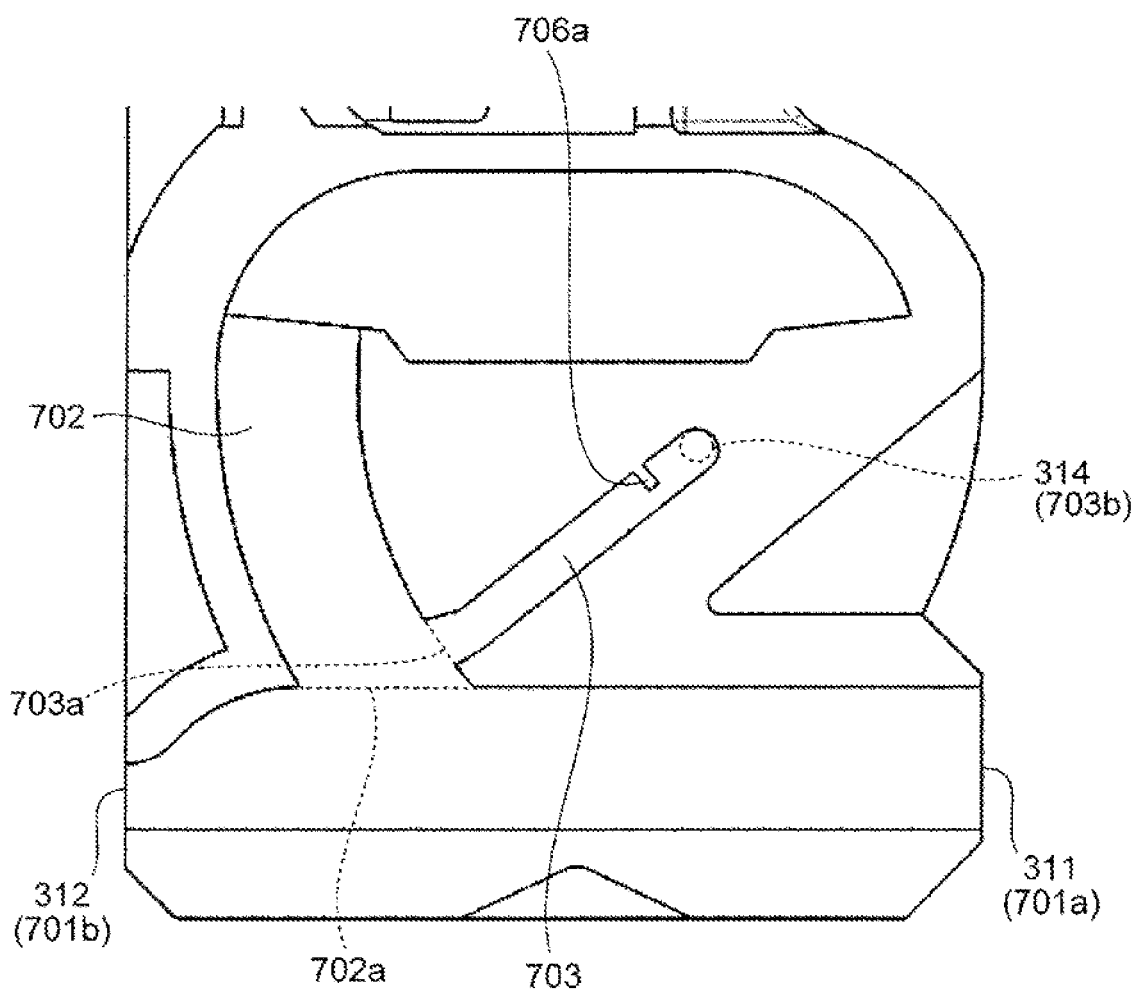
FIG. 9A is a view illustrating a specific example of a thermal flowmeter according to a third embodiment.
Figure 9B:
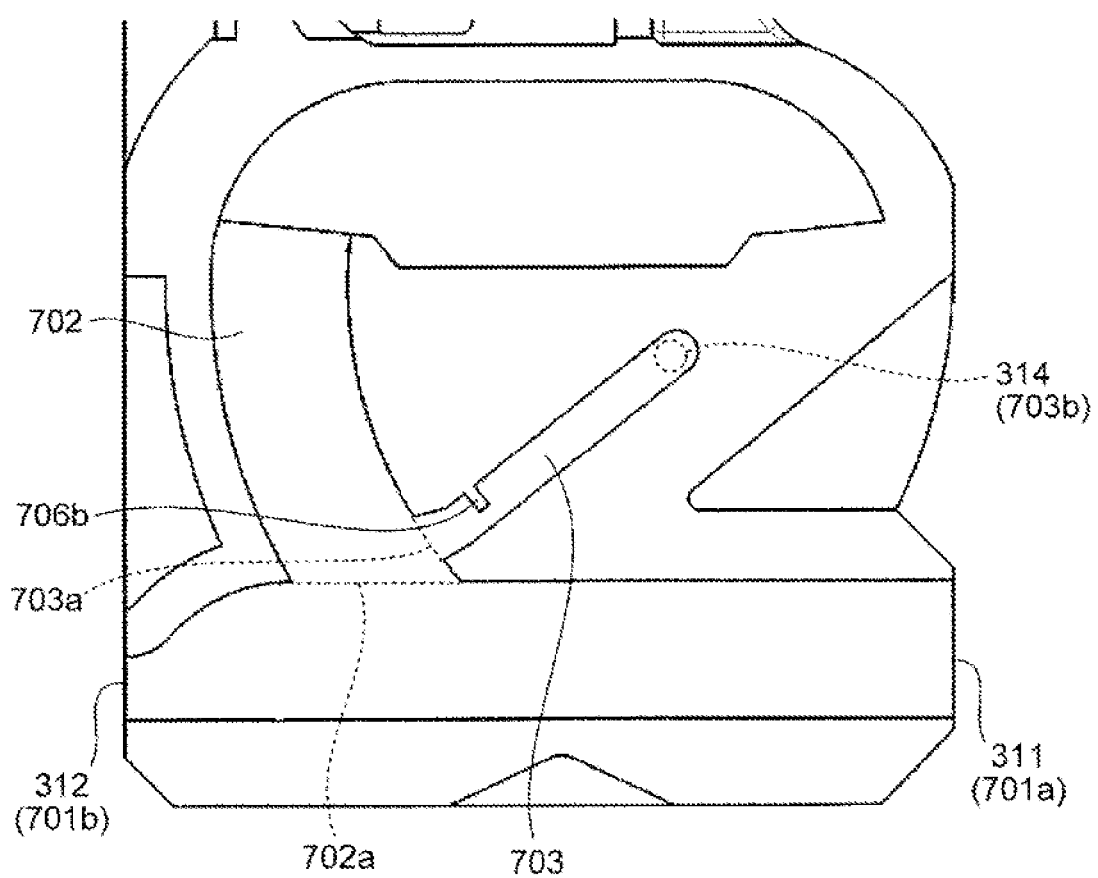
FIG. 9B is a view illustrating a specific example of the thermal flowmeter according to the third embodiment.

Next, a third embodiment of the present invention will be described. FIGS. 9A and 9B are views for describing specific examples of a thermal flowmeter according to the third embodiment.

A characteristic point of the present embodiment is that a pressure loss generation means is configured using an orifice structural portion. Incidentally, constituent elements which are the same as those of the first embodiment will be denoted by the same reference signs, and a detailed description thereof will be omitted.

In the example illustrated in FIG. 9A, an orifice structural portion 706a is provided in the vicinity of the third outlet 703b of the third passage portion 703. The orifice structural portion 706a has a convex shape protruding from one groove wall surface of the third groove portion 334. The third passage portion 703 extends from the third inlet 703a toward the third outlet 703b with a constant sectional area.

The orifice structural portion 706a causes flow separation around the orifice structural portion 706a and generates a pressure loss. Therefore, a pressure gradient from the third inlet 703a to the orifice structural portion 706a increases, and water droplets are easily guided to the vicinity of the orifice structural portion 706a. Meanwhile, a pressure difference between the inside and the outside of the drain hole 314, which is the third outlet 703b, is reduced, the amount of water droplets flowing out at once from the drain hole 314 decreases, and it is possible to suppress the inflow of water droplets more than the discharge capacity of the drain hole 314.

Although the orifice structural portion 706a is provided in the vicinity of the third outlet 703b in the present embodiment as illustrated in FIG. 9A, it suffices if the orifice structural portion 706a is provided between the third inlet 703a and the third outlet 703b of the third passage portion 703. In addition, the orifice structural portion 706a may protrude from both the groove wall surfaces of the second passage portion 703 instead of protruding from the one groove wall surface, may protrude from a groove bottom surface of the third passage portion 703, or may protrude from the back cover 304. Further, the orifice structural portion 706a may be provided in the vicinity of the third inlet 703a of the third passage portion 703, such as an orifice structural portion 706b illustrated in FIG. 9B, or may be installed in plural. Further, it is desirable to set a position of the orifice structural portion 706a or 706b in the vicinity of the third outlet 703b since it is most effective to change the pressure gradient immediately before the third outlet 703b.

Fourth Embodiment

Next, a fourth embodiment of the present invention will be described. A characteristic point of the present embodiment is that a pressure loss generation means is configured using a bent structural portion. Incidentally, constituent elements which are the same as those of the first embodiment will be denoted by the same reference signs, and a detailed description thereof will be omitted.

Figure 10A:
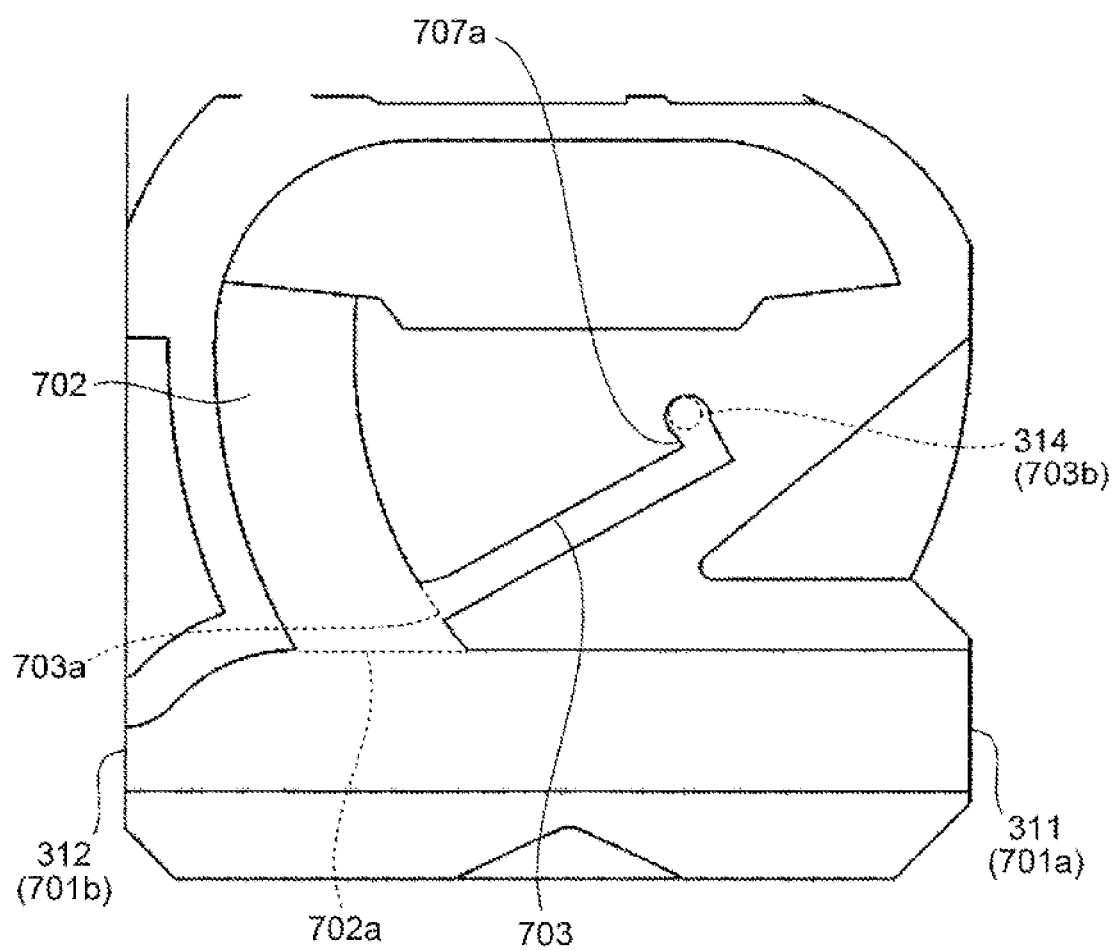
FIG. 10A is a view illustrating a specific example of a thermal flowmeter according to a fourth embodiment.

In the example illustrated in FIG. 10A, a bent structural portion 707a is provided in the vicinity of the third outlet 703b of the third passage portion 703. The third passage portion 703 extends from the third inlet 703a toward the third outlet 703b with a constant sectional area, and the bent structural portion 707a is formed as the third passage portion 703 is bent in the vicinity of the third outlet 703b. In the present embodiment, a bending angle $\theta$ is set to 89° to 91°.

The bent structural portion 707a causes flow separation around the bent structural portion 707a and generates a pressure loss. Therefore, a pressure gradient from the third inlet 703a to the bent structural portion 707a increases, and water droplets are easily guided to the vicinity of the bent structural portion 707a. Meanwhile, a pressure difference between the inside and the outside of the drain hole 314, which is the third outlet 703b, is reduced, the amount of water droplets flowing out at once from the drain hole 314 decreases, and it is possible to suppress the inflow of water droplets more than the discharge capacity of the drain hole 314.

The third passage portion 703 is formed to be obliquely inclined so as to proceed from the distal end portion side to the proximal end portion side as proceeding from the other end portion 318 side toward the one end portion 317 side of the housing 301, and is bent toward the proximal end portion side of the housing 301 at an end portion on the one end portion side of the housing 301 by the bent structural portion 707a. Therefore, for example, when there is no flow of air due to an engine operation stop in a case where the proximal end portion and the distal end portion of the housing 301 are attached to the main passage 124 in a posture state of being vertically arranged, it is possible to cause water droplets inside the third passage portion 703 to move by its own weight and to be discharged from the third inlet 703a, and it is possible to prevent the water droplets from staying in the third passage portion 703.

Figure 10B:
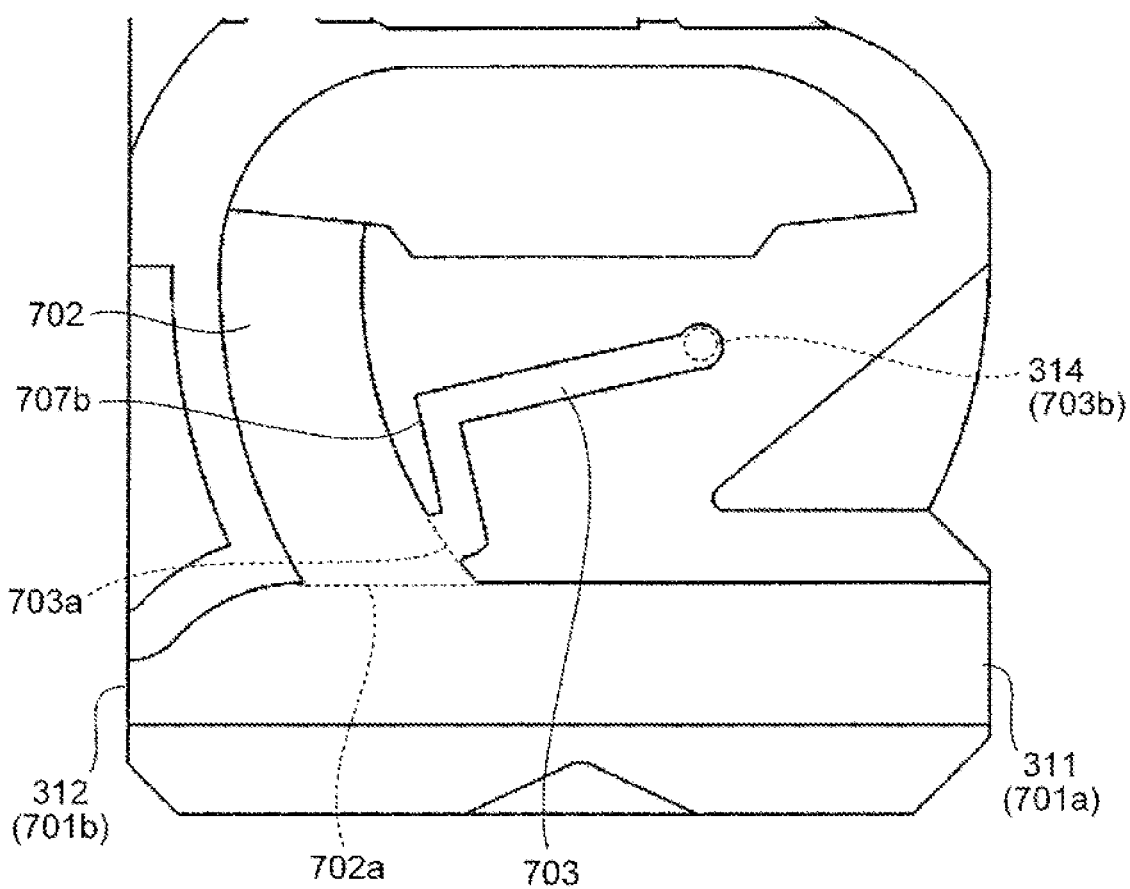
FIG. 10B is a view illustrating a specific example of the thermal flowmeter according to the fourth embodiment.

Although the bent structural portion 707a is provided in the vicinity of the third outlet 703b in the present embodiment as illustrated in FIG. 10A, it suffices if the bent structural portion 707a is provided between the third inlet 703a and the third outlet 703b of the third passage portion 703. In addition, the bending angle θ is not limited to 89° to 91°, but may be any angle as long as the pressure loss can be generated by causing the separation flow during passage of a fluid. In addition, a bent structural portion 707b may be provided in the vicinity of the third inlet 703a of the third passage portion 703 as illustrated in FIG. 10B, or may be installed at two or more places, that is, a plurality of places. Further, it is desirable to set a position of the bent portion 707a or 707b in the vicinity of the third outlet 703b since it is most effective to change the pressure gradient immediately before the third outlet 703b.

Fifth Embodiment

Figure 11:
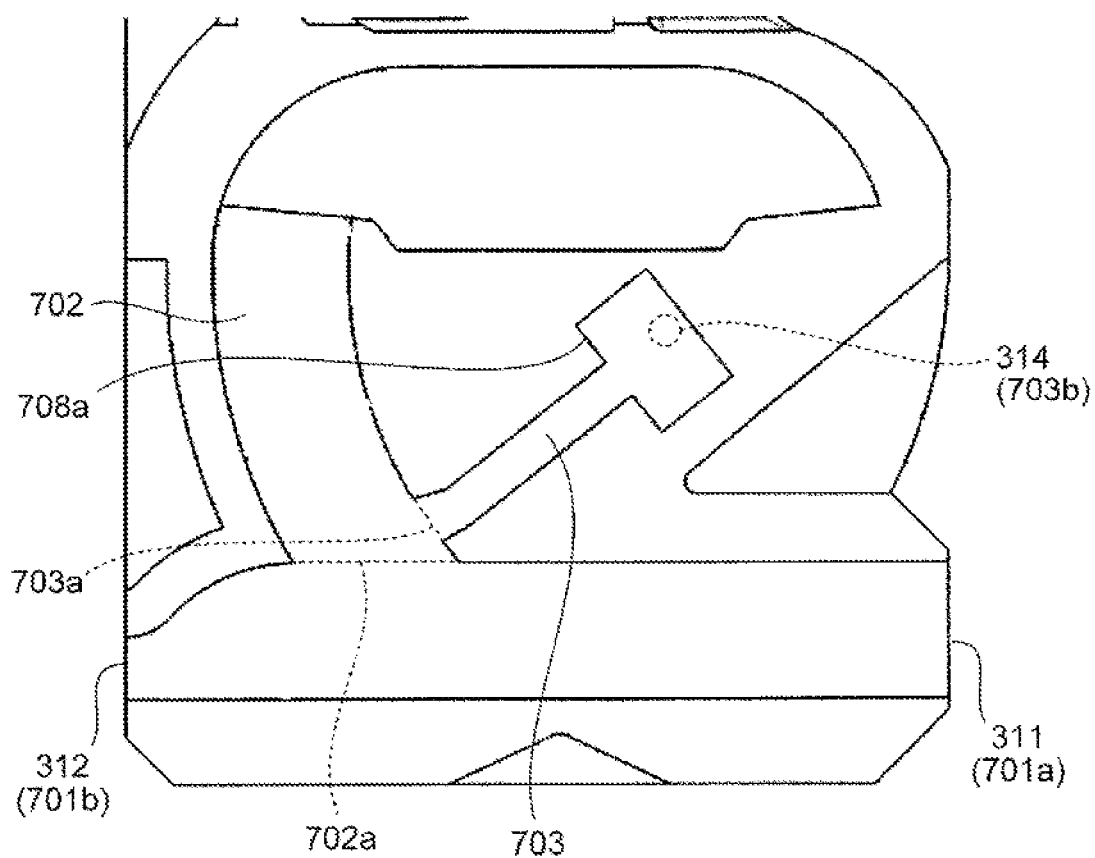
FIG. 11 is a view illustrating a specific example of a thermal flowmeter according to a fifth embodiment.

Next, a fifth embodiment of the present invention will be described. FIG. 11 is a view for describing a specific example of a thermal flowmeter according to the fifth embodiment.

A characteristic point of the present embodiment is that a pressure loss generation means is configured using an abruptly-expanded structural portion. Incidentally, constituent elements which are the same as those of the first embodiment will be denoted by the same reference signs, and a detailed description thereof will be omitted.

In the example illustrated in FIG. 11, an abruptly-expanded structural portion 708a is provided in the vicinity of the third outlet 703b of the third passage portion 703. The abruptly-expanded structural portion 708a is formed by expanding a passage width of the third passage portion 703, which extends from the third inlet 703a to the third outlet 703b with a constant sectional area, in a stepwise manner in the vicinity of the third outlet 703b.

The abruptly-expanded structural portion 708a causes flow separation around the abruptly-expanded structural portion 708a and generates a pressure loss. Therefore, a pressure gradient from the third inlet 703a to the abruptly-expanded structural portion 708a increases, and water droplets are easily guided to the vicinity of the abruptly-expanded structural portion 708a. Meanwhile, a pressure difference between the inside and the outside of the drain hole 314, which is the third outlet 703b, is reduced, the amount of water droplets flowing out at once from the drain hole 314 decreases, and it is possible to suppress the inflow of water droplets more than the discharge capacity of the drain hole 314.

Although the abruptly-expanded structural portion 708a is formed in the vicinity of the third outlet 703b in the present embodiment as illustrated in FIG. 11, it suffices if the abruptly-expanded structural portion 708a is provided inside the third passage portion 703 except for the change in the sectional area of the third outlet 703b itself. In addition, the abruptly-expanded structural portion 708a has the configuration of expanding in a stepwise manner on both the sides in the groove width direction of the third passage 703 in the present embodiment, but not both the sides but only one side may be expanded. The area other than the passage sectional area before and after the abruptly-expanded structural portion 708a may be constant or inconstant. In addition, one side in the height direction of the third passage portion 703 may be expanded, or both the sides may be enlarged. Further, the abruptly-expanded structural portion 708a is not limited to the shape of being expanded in a stepwise manner, but may be a gently expanded shape, and the number of the abruptly-expanded structural portions 708a is not limited to one but may be plural. Further, it is desirable to set a position of the abruptly-expanded structural portion 708a in the vicinity of the third outlet 703b since it is most effective to change the pressure gradient immediately before the third outlet 703b.

Sixth Embodiment

Figure 12:
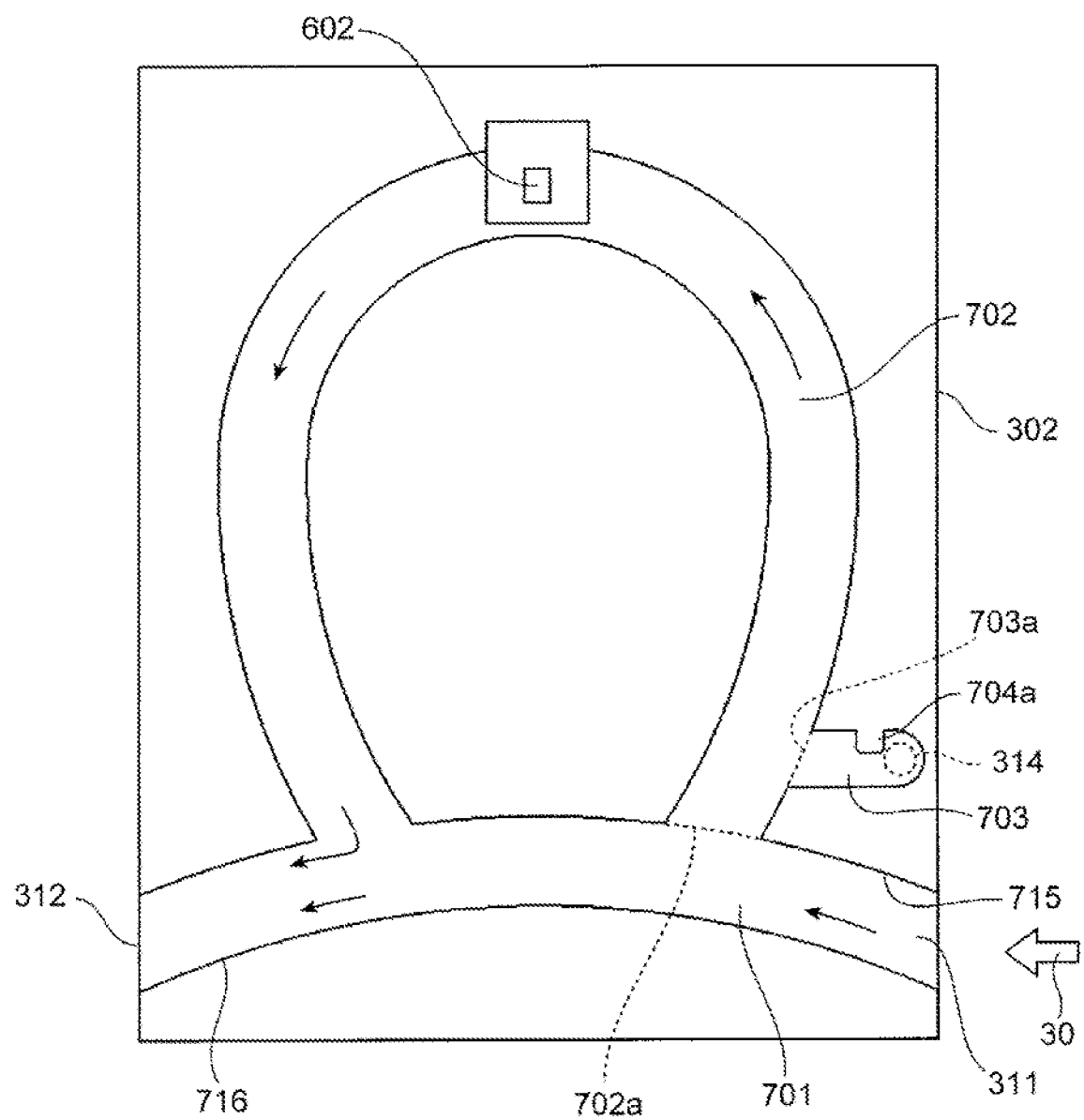
FIG. 12 is a view illustrating a specific example of a thermal flowmeter according to a sixth embodiment.

Next, a sixth embodiment of the present invention will be described. FIG. 12 is a view for describing a specific example of a thermal flowmeter according to the sixth embodiment. Incidentally, constituent elements which are the same as those of each of the above-described embodiments will be denoted by the same reference signs, and a detailed description thereof will be omitted.

In the present embodiment, a shape of a sub-passage is different from each of the above-described embodiments. The sub-passage is formed in cooperation of a sub-passage groove formed in the housing body 302 and a cover (not illustrated). The sub-passage has the first passage portion 701, the second passage portion 702, and the third passage portion 703, which is similar to the configuration of each of the above-described embodiments. The first passage portion 701 is provided from one end portion of the housing 301 to the other end portion and communicates between the inlet 311 and the outlet 312. The first passage portion 701 extends while gently curving along the flow direction of the measurement gas 30 flowing through the main passage 124.

The second passage portion 702 has a detour shape that branches from the first passage portion 701 at one end portion side of the housing body 302 and joins to a downstream portion of the first passage portion 701 at the other end portion side of the housing body 302, and the flow detection unit 602 is provided in a middle position thereof. The second passage portion 702 branches from the first passage portion 701 and proceeds in a direction away from the first passage portion 701. Further, the housing 301 has a curved shape that proceeds from the one end portion side to the other end portion side of the housing 301 at a position away from the first passage portion 701, and then, proceeds in a direction approaching the first passage portion 701.

The third passage portion 703 has the third inlet 703a open in an outer circumferential surface of the second passage portion 702 and extends from the third inlet 703a toward the one end portion side of the housing 301. The drain hole 314 is provided in the cover (not illustrated) so as to be arranged at a terminal end portion of the third passage portion 703. The drain hole 314 serves as the third outlet 703b of the third passage portion 703. The third passage portion 703 has the abruptly-reduced structural portion 704a in the vicinity of the drain hole 314.

According to the present invention, the abruptly-reduced structural portion 704a is provided, as the pressure loss generation means, between the third inlet 703a and the third outlet 703b of the third passage portion 703. thus, it is possible to effectively guide the water droplets, which have been drawn into the third passage portion 703 and directed toward the third outlet 703b as the drain hole 314, to the third outlet 703b using the pressure gradient caused by generation of the pressure loss before and after the abruptly-reduced structural portion 704a. In addition, since the pressure gradient in the vicinity of the third outlet 703b of the third passage portion 703 can be reduced, it is possible to discharge the water without exceeding the water discharge capacity limit of the drain hole 314, to prevent the water droplets that have not been discharged from entering the second passage portion 702, and to protect the flow detection unit 602 of the second passage portion 702 from the water droplets.

As above, the embodiments of the present invention have been described in detail, but the present invention is not limited to the above-described embodiments, and various design modifications can be made without departing from the spirit of the present invention recited in the claims. For example, the above-described embodiments have been described in detail in order to describe the present invention in an easily understandable manner, and are not necessarily limited to one including the entire configuration that has been described above. In addition, configurations of another embodiment can be substituted for some configurations of a certain embodiment, and further, a configuration of another embodiment can be added to a configuration of a certain embodiment. In addition, addition, deletion, or substitution of other configurations can be made with respect to some configurations of each embodiment.

REFERENCE SIGNS LIST 30 measurement gas
124 main passage
300 thermal flowmeter
301 housing (casing)
302 housing body
303 front cover
304 back cover
311 inlet (first inlet of first passage)
312 first outlet (first outlet of first passage portion)
313 second outlet (second outlet of second passage portion)
314 drain hole
602 flow detection unit
701 first passage portion
701a first inlet
701b first outlet
702 second passage portion
702a second inlet
702b second outlet
703 third passage portion
703a third inlet
703b third outlet
704a abruptly-reduced structural portion (pressure loss generation means)
705a passage resistance structural portion (pressure loss generation means)
706a orifice structural portion (pressure loss generation means)
707a bent structural portion (pressure loss generation means)
708a abruptly-expanded structural portion (pressure loss generation means)

The invention claimed is:

1. A thermal flowmeter comprising:
a casing arranged in a main passage;
a sub-passage that takes a measurement gas flowing through the main passage into the casing; and
a flow detection unit that measures a flow rate of the measurement gas in the sub-passage,
wherein the sub-passage includes:
a first passage portion communicating between a first inlet open to the casing and a first outlet open to the casing;
a second passage portion communicating between a second inlet open to the first passage portion and a second outlet open to the casing or the first passage portion; and
a third passage portion communicating between a third inlet open to the second passage portion and a third outlet open to the casing, and
a pressure loss generation means is provided between the third inlet and the third outlet of the third passage portion.

2. The thermal flowmeter according to claim 1, wherein the pressure loss generation means is provided at a position near the third outlet.

3. The thermal flowmeter according to claim 1, wherein the pressure loss generation means has an abruptly-reduced structural portion in which a passage sectional area of the third passage portion is reduced in a stepwise manner.

4. The thermal flowmeter according to claim 1, wherein the pressure loss generation means has an orifice structural portion.

5. The thermal flowmeter according to claim 1, wherein the pressure loss generation means has a passage resistance structural portion which is resistance of a fluid flowing from the third inlet toward the third outlet.

6. The thermal flowmeter according to claim 1, wherein the pressure loss generation means has a bent structural portion bent at a position in middle of a passage of the third passage portion.

7. The thermal flowmeter according to claim 1, wherein the pressure loss generation means has an abruptly-expanded structural portion in which a passage sectional area of the third passage portion is expanded in a stepwise manner.

8. The thermal flowmeter according to claim 1, wherein the third outlet is arranged at a position closer to one end portion side of the casing in which the first inlet opens than the third inlet.

9. The thermal flowmeter according to claim 8, wherein the first passage portion extends along a flow direction of the measurement gas flowing through the main passage,
the second passage portion has a curved shape so as to proceed in a direction away from the first passage portion, proceed toward the one end portion side of the casing from the other end portion side of the casing where the first outlet is open at a position away from the first passage portion, and then, proceed in a direction approaching the first passage portion, and
the third passage portion has the third inlet open to an inner circumferential surface of the second passage portion and extends from the third inlet toward the one end portion side of the casing.

10. The thermal flowmeter according to claim 8, wherein the first passage portion extends along a flow direction of the measurement gas flowing through the main passage,
the second passage portion has a curved shape so as to proceed in a direction away from the first passage portion, proceed toward the other end portion side of the casing from the one end portion side of the casing where the first inlet is open at a position away from the first passage portion, and then, proceed in a direction approaching the first passage portion, and
the third passage portion has the third inlet open to an outer circumferential surface of the second passage portion and extends from the third inlet toward the one end portion side of the casing.

* * * * *